(12) United States Patent
Choi

(10) Patent No.: US 7,558,901 B2
(45) Date of Patent: Jul. 7, 2009

(54) APPARATUS AND METHOD FOR CONNECTING PROCESSOR TO BUS

(75) Inventor: Sung-kyu Choi, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 792 days.

(21) Appl. No.: 10/758,040

(22) Filed: Jan. 16, 2004

(65) Prior Publication Data

US 2004/0153587 A1 Aug. 5, 2004

(30) Foreign Application Priority Data

Jan. 18, 2003 (KR) .................... 10-2003-0003471

(51) Int. Cl.
 *G06F 3/00* (2006.01)
 *G06F 13/36* (2006.01)
 *G06T 1/00* (2006.01)
 *G06T 1/60* (2006.01)

(52) U.S. Cl. .................. 710/310; 710/52; 710/306; 710/309; 710/315; 345/501; 345/530

(58) Field of Classification Search .............. 710/22, 710/52, 100, 105, 119, 241, 305, 308, 306, 710/309, 310, 315; 709/250; 713/600; 324/719; 345/501, 530; 375/354; 370/428
See application file for complete search history.

(56) References Cited

U.S. PATENT DOCUMENTS

| | | | | |
|---|---|---|---|---|
| 4,639,861 A * | 1/1987 | Appiano et al. | ............. | 710/119 |
| 4,958,271 A * | 9/1990 | Yoshida et al. | ............. | 710/309 |
| 5,239,651 A * | 8/1993 | Sodos | ......... | 710/241 |
| 5,265,216 A * | 11/1993 | Murphy et al. | ............. | 710/105 |
| 5,287,457 A * | 2/1994 | Arimilli et al. | ............. | 710/308 |
| 5,509,124 A * | 4/1996 | Bourke et al. | ............. | 710/100 |
| 5,572,676 A * | 11/1996 | Ohnishi | ......... | 709/250 |
| 6,075,830 A * | 6/2000 | Piirainen | ......... | 375/354 |
| 6,088,743 A * | 7/2000 | Takeda | ......... | 710/52 |
| 6,265,885 B1 * | 7/2001 | Luo et al. | ......... | 324/719 |
| 6,286,072 B1 * | 9/2001 | Bredin et al. | ............. | 710/305 |
| 6,429,871 B1 * | 8/2002 | Katsura et al. | ............. | 345/501 |
| 6,553,435 B1 * | 4/2003 | Normoyle et al. | ............. | 710/22 |
| 6,633,994 B1 * | 10/2003 | Hofmann et al. | ............ | 713/600 |
| 6,970,477 B2 * | 11/2005 | Chuang et al. | ............. | 370/428 |
| 2003/0084226 A1 * | 5/2003 | Barrenscheen et al. | ...... | 710/305 |

FOREIGN PATENT DOCUMENTS

JP 2000-92365 A 3/2000

* cited by examiner

*Primary Examiner*—Thomas J Cleary
(74) *Attorney, Agent, or Firm*—Sughrue Mion, PLLC

(57) ABSTRACT

An apparatus and method for connecting a processor to buses. The apparatus includes a multiplexer which, when addressing information indicating the address of a first memory connected to a synchronous data bus synchronized with a processor, from the processor is received, receives first data from the processor and transfers the received first data to the first memory through the synchronous data bus, or receives second data from the first memory through the synchronous data bus and transfers the received second data to the processor, and if address information indicating the address of a second memory connected to an asynchronous data bus not synchronized with the processor, from the processor is received, receives third data from the processor and transfers the third data to a buffer, or receives fourth data from the buffer and transfers the fourth data to the processor.

10 Claims, 22 Drawing Sheets

APPARATUS AND METHOD FOR CONNECTING PROCESSOR TO BUS

This application claims priority from Korean Patent Application No. 2003-3471, filed on Jan. 18, 2003, the contents of which are incorporated herein by reference in their entirety.

BACKGROUND OF THE INVENTION

1. Field of the Invention

The present invention relates to an apparatus and method for connecting a processor to a bus.

2. Description of the Related Art

FIG. 1 is a block diagram of the structure of a related art dual bus path system. The related art dual bus path system comprises a first memory 11, an input apparatus 12, a processor 13, a bus controller 14, a second memory 15, and an output apparatus 16.

The first memory 11 is a space which the processor 13 uses for operations and the second memory 15 is a space in which display data are stored. The first memory 11 and the second memory 12 are connected to different buses. If the amount of display data is great and there is only one bus, the bus is easily filled to the limit of the transmission capacity. Accordingly, there is an additional bus which is used exclusively for transferring display data.

At present, due to the growing size of display screens and improvement in picture quality, the amount of data needed in a display apparatus increases and even the related art exclusive bus used for display is easily filled to the limit of the transmission capacity. The speed of the bus may be raised to solve the problem. However, there is a limit in raising the speed due to the relations with the processor clock, and raising the speed increases power consumption. In addition, other peripherals are required to be designed to operate at the raised speed.

SUMMARY OF THE INVENTION

The present invention provides an apparatus and method by which data are transferred through a synchronous bus synchronized with a processor and display data are transferred through an asynchronous bus not synchronized with the processor.

According to an aspect of the present invention, there is provided a processor bus connection apparatus comprising a multiplexer which, when address information indicating the address of a first memory connected to a synchronous data bus synchronized with a processor, from the processor is received, receives first data from the processor and transfers the received first data to the first memory through the synchronous data bus, or receives second data from the first memory through the synchronous data bus and transfers the received second data to the processor, and when address information indicating the address of a second memory connected to an asynchronous data bus not synchronized with the processor, from the processor is received, receives third data from the processor and transfers the third data to a buffer, or receives fourth data from the buffer and transfers the fourth data to the processor. The apparatus also includes and a buffer which receives the third data from the multiplexer, stores the third data, and transfers the stored third data to the second memory through the asynchronous data bus, or receives the fourth data from the second memory through the asynchronous data bus, stores the fourth data, and transfers the stored fourth data to the multiplexer.

According to another aspect of the present invention, there is provided a multiplexing apparatus comprising: a synchronous data bus write unit which when address information indicating the address of a first memory connected to a synchronous data bus synchronized with a processor is provided by the processor and control information indicating a request for writing in the first memory is provided by the processor, receives first data from the processor and transfers the received first data to the first memory through the synchronous data bus; a synchronous data bus read unit which when address information indicating the address of the first memory is provided by the processor and control information indicating a request for reading from the first memory is provided by the processor, receives second data from the first memory through the synchronous data bus and transfers the received data to the processor. This apparatus also includes a buffer write unit which when address information indicating the address of a second memory connected to an asynchronous data bus not synchronized with the processor is provided by the processor and control information indicating a request for writing in the second memory is provided by the processor, receives third data from the processor and transfers the received third data to a buffer connected to the asynchronous data bus; and a buffer read unit which when address information indicating the address of the second memory is provided by the processor and control information indicating a request for reading from the second memory is provided by the processor, receives fourth data from the buffer and transfers the received fourth data to the processor.

According to still another aspect of the present invention, there is provided a buffering apparatus comprising: an asynchronous data bus write unit which when control information indicating a request for writing in a buffer connected to an asynchronous data bus not synchronized with a processor is provided by a multiplexer connected to the processor, receives third data from the multiplexer, stores the data, and transfers the stored third data to a second memory through the asynchronous data bus; and an asynchronous data bus read unit which when control information indicating a request for reading from the buffer is provided by the multiplexer, receives fourth data from the second memory through the asynchronous data bus, stores the data, and transfers the stored fourth data to the multiplexer.

According to yet another aspect of the present invention, there is provided a synchronous bus and asynchronous bus path system comprising: a processor which generates first data or third data from input data transferred by a processor bus connection apparatus and transfers the generated data to the processor bus connection apparatus, or generates output data from second data or fourth data and transfers the generated output data to the processor bus connection apparatus; and the processor bus connection apparatus which receives the input data from an input apparatus through a synchronous bus and transfers the received input data to the processor, or receives the first data from the processor and transfers the received first data to the first memory through the synchronous data bus, or receives the second data from the first memory through the synchronous data bus and transfers the received second data to the processor, or receives the third data from the processor, stores the data, and transfers the stored third data to the second memory through the asynchronous bus, or receives the fourth data from the second memory through the asynchronous bus, stores the data, and transfers the stored fourth data to the processor, or receives the output data from the processor, stores the data, and transfers the stored output data to an output apparatus through the asynchronous data bus.

According to a further aspect of the present invention, there is provided a processor bus connection method comprising: (a) when address information indicating the address of a first memory connected to a synchronous data bus synchronized with the processor, from the processor is received, receiving first data from the processor and transferring the received first data to the first memory through the synchronous data bus, or receiving second data from the first memory through the synchronous data bus and transferring the received second data to the processor; and (b) when address information indicating the address of a second memory connected to an asynchronous data bus not synchronized with the processor, from the processor is received, receiving third data from the processor, transferring the third data, storing the transferred third data, and transferring the stored third data to the second memory through the asynchronous data bus, or receiving fourth data from the second memory through the asynchronous data bus, storing the fourth data, transferring the stored fourth data, receiving the transferred fourth data, and transferring the received fourth data to the processor.

According to an additional aspect of the present invention, there is provided a multiplexing method comprising: (a) when address information indicating the address of a first memory connected to a synchronous data bus synchronized with a processor is provided by the processor and control information indicating a request for writing in the first memory is provided by the processor, receiving first data from the processor and transferring the received first data to the first memory through the synchronous data bus; (b) when address information indicating the address of the first memory is provided by the processor and control information indicating a request for reading from the first memory is provided by the processor, receiving second data from the first memory through the synchronous data bus and transferring the received data to the processor; (c) when address information indicating the address of a second memory connected to an asynchronous data bus not synchronized with the processor is provided by the processor and control information indicating a request for writing in the second memory is provided by the processor, receiving third data from the processor and transferring the received third data to a buffer connected to the asynchronous data bus; and (d) when address information indicating the address of the second memory is provided by the processor and control information indicating a request for reading from the second memory is provided by the processor, receiving fourth data from the buffer and transferring the received fourth data to the processor.

In another aspect of the present invention, there is provided a buffering method comprising: (a) when control information indicating a request for writing in a buffer connected to an asynchronous data bus not synchronized with a processor is provided by a multiplexer connected to the processor, receiving third data from the multiplexer, storing the data, and transferring the stored third data to a second memory through the asynchronous data bus; and (b) when control information indicating a request for reading from the buffer is provided by the multiplexer, receiving fourth data from the second memory through the asynchronous data bus, storing the data, and transferring the stored fourth data to the multiplexer.

According to yet another aspect of the present invention, there is provided a synchronous bus and asynchronous bus path method comprising: (a) receiving input data form a user and transferring the received input data through a synchronous bus synchronized with a processor; (b) receiving the input data through the synchronous bus and transferring the received input data; (c) generating first data or third data from the transferred input data and transferring the generated data; (d) receiving the first data, transferring the received first data to a first memory through the synchronous data bus, or receiving and storing third data and transferring the stored third data to a second memory through an asynchronous bus not synchronized with the processor; (e) receiving the first data through the synchronous bus and storing the data; and (f) receiving the third data through the asynchronous bus and storing the data.

BRIEF DESCRIPTION OF THE DRAWINGS

The above objects and advantages of the present invention will become more apparent by describing in detail exemplary embodiments thereof with reference to the attached drawings in which.

DETAILED DESCRIPTION OF THE INVENTION

Figure 1:
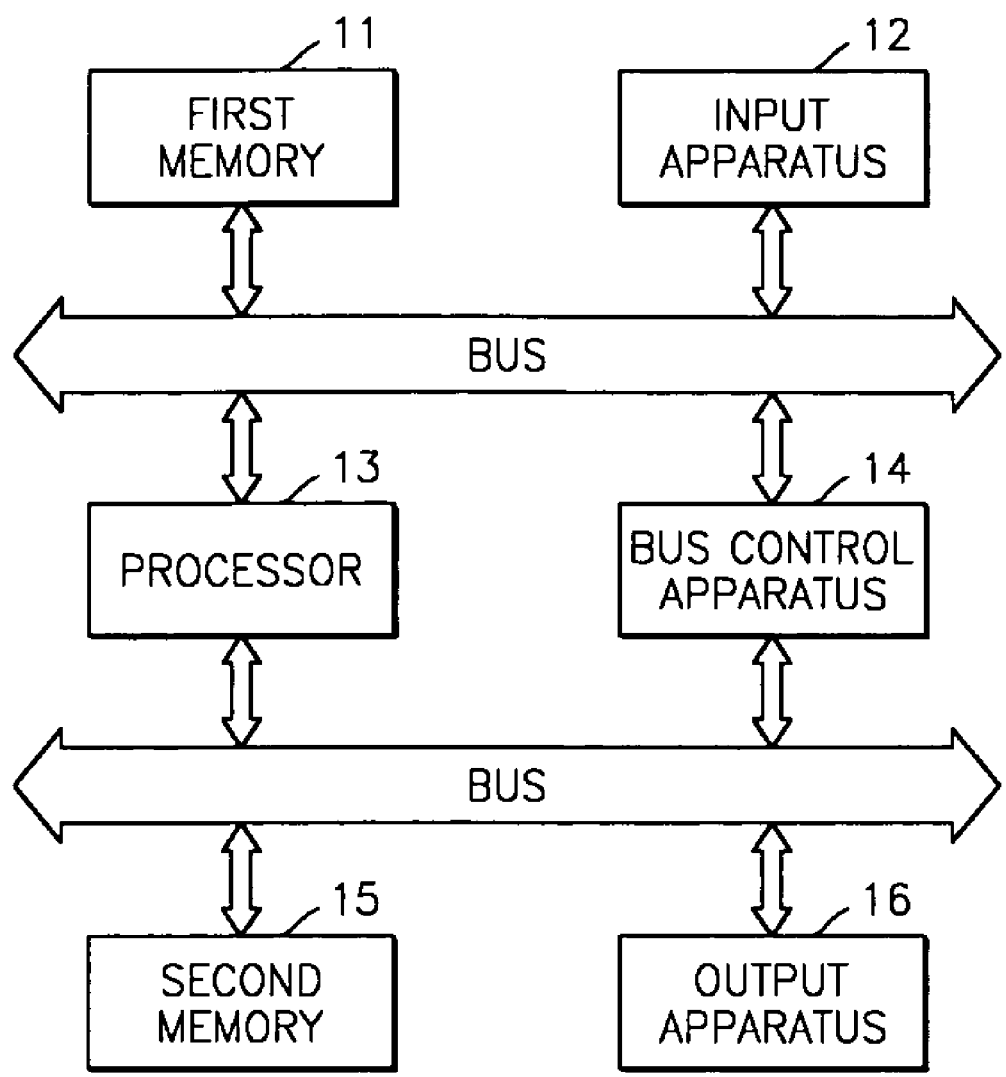
FIG. 1 is a block diagram of the structure of a related art dual bus path system.
Figure 2:
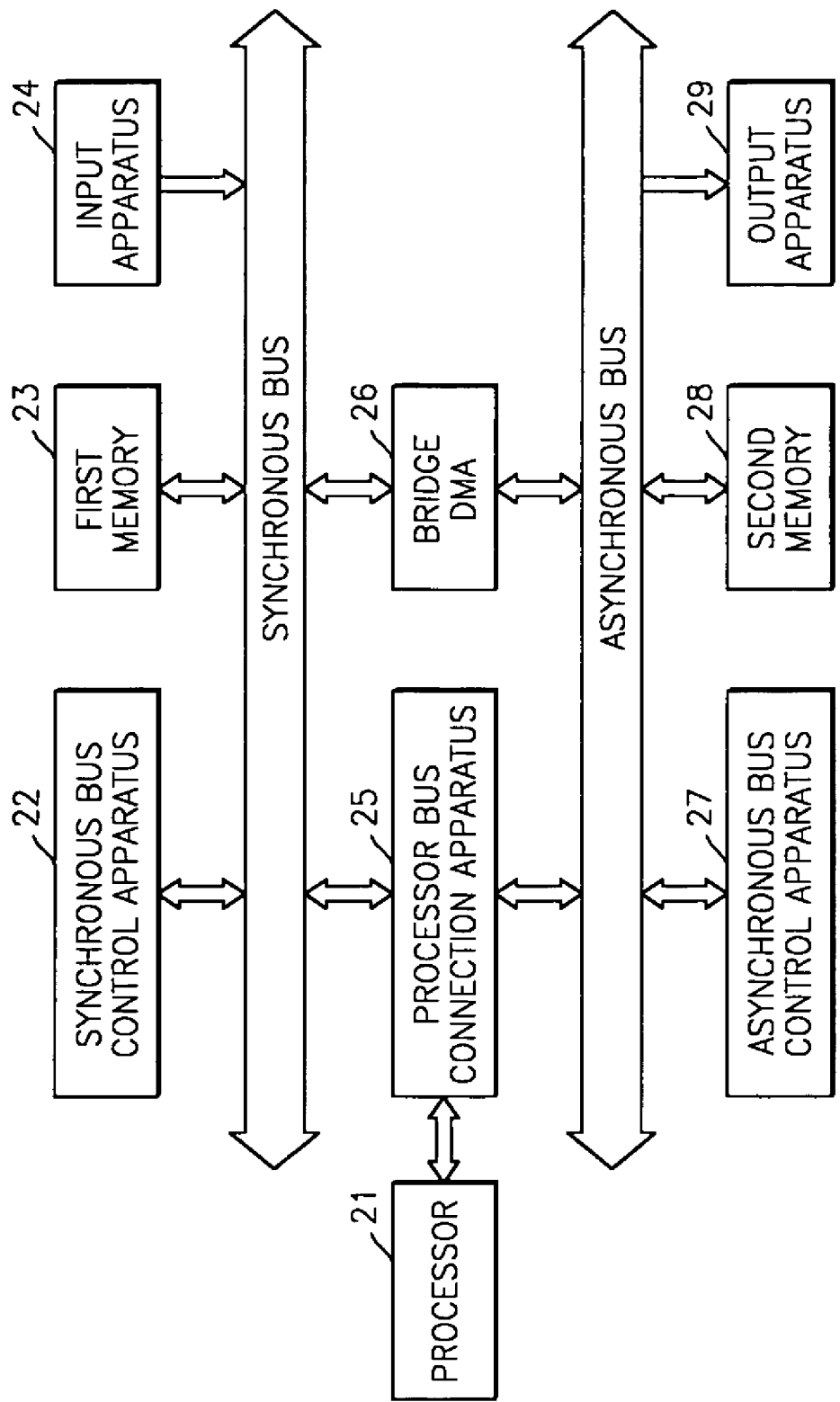
FIG. 2 is a block diagram of the structure of a synchronous bus and asynchronous bus path system according to an exemplary embodiment of the present invention.

Referring to FIG. 2, the synchronous bus and asynchronous bus path system comprises a processor 21, a process bus connection apparatus 25, a bridge direct memory access (DMA) 26, an asynchronous bus control apparatus 27, a second memory 28, and an output apparatus 29. The synchronous bus and asynchronous bus path system transfers data through a synchronous bus synchronized with the processor 21 and an asynchronous bus not synchronized with the processor 21. A synchronous bus control apparatus 22, a first memory 23, and an input apparatus 24 are connected to the synchronous bus and the asynchronous bus control apparatus 27, the second memory 28, and the output apparatus 29 are connected to the asynchronous bus. The processor bus connection apparatus 25 and the bridge DMA 26 are connected to both the synchronous bus and the asynchronous bus. Depending on an environment to which the system is applied, the input apparatus 24 may be connected to the asynchronous bus and the output apparatus 29 may be connected to the synchronous bus. As in the present embodiment, when the input apparatus 24 is connected to the synchronous bus and the output apparatus 29 is connected to the asynchronous bus, it means that in order to reduce the amount of data transferred through the synchronous bus synchronized with the processor, display data, whose amount is great, is transferred through the asynchronous data bus, and accordingly the output apparatus is a display apparatus in most cases.

The processor 21 generates first data or third data from the input data transferred by the processor bus connection apparatus 25 and transfers the generated data to the processor bus connection apparatus 25, or generates second data or fourth data and transfers the generated data to the processor bus connection apparatus 25. The input data is input by a user through the input apparatus 24 such as a keyboard, a mouse, a universal serial bus (USB), or a universal asynchronous receiver/transmitter (UART). In the present embodiment, since the input apparatus 24 is connected to the synchronous bus, the input data is transferred to the processor bus connection apparatus 25 through the synchronous bus, and is again transferred from the processor bus connection apparatus 25 to the processor 21. According to the command of the user, the processor 21 processes the input data such that the first data or the third data is generated. Then, the processor 21 transfers the generated data to the processor bus connection apparatus 25. The first data indicates data to be transferred to the first memory 23 through the synchronous data bus and the third data indicates data to be transferred to the second memory 28 through the asynchronous bus. The second data indicates data stored in the first memory 23 and the fourth data indicates data stored in the second memory 28. The second data is transferred to the processor bus connection apparatus 25 through the synchronous bus and is again transferred from the processor bus connection apparatus 25 to the processor 21. The fourth data is transferred to the processor bus connection apparatus 25 through the asynchronous bus and is again transferred from the processor bus connection apparatus 25 to the processor 21. According to the command of the user, the processor 21 processes the second data or the fourth data such that the output data is generated. Then, the processor 21 transfers the output data to the processor bus connection apparatus 25. Since this is just one embodiment, according to the user command, the first or third data may be processed such that the output data is generated.

The processor bus connection apparatus 25 connects the processor 21 to the synchronous bus or the asynchronous bus such that the processor 21 can freely read data from and write data in the second memory 28 that operates irrespective of the clock of the processor 21. That is, the processor bus connection apparatus 25, as described above, receives input data through the synchronous bus and transfers the received input data to the processor 21. Also, as described above, the processor bus connection apparatus 25 receives the first data from the processor 21 and transfers the received first data to the first memory 23 through the synchronous bus. Further, as described above, the processor bus connection apparatus 25 receives the second data from the first memory through the synchronous data bus and transfers the received second data to the processor 21. In addition, as described above, the processor bus connection apparatus 25 receives and stores the third data from the processor 21 and transfers the stored third data to the second memory through the asynchronous bus. Also, as described above, the processor bus connection apparatus 25 receives and stores the fourth data from the second memory through the asynchronous bus and transfers the stored fourth data to the processor 21. Also, as described above, the processor bus connection apparatus 25 receives and stores the output data from the processor 21 and transfers the stored output data to the output apparatus 29 through the asynchronous bus.

The first memory 23 receives and stores the first data from the processor bus connection apparatus 25 through the synchronous bus, or transfers the stored second data to the processor bus connection apparatus 25 through the synchronous bus. Accordingly, the first memory can be understood as a memory which operates geared to the processor 21 and stores the system's operating system (OS) or critical job programs. As the first memory, for example, a random access memory (RAM), a flash memory, or a read only memory (ROM) is used. When the ROM that is only for read is used as the first memory, the stored second data may be transferred to the processor bus connection apparatus 25 through the synchronous bus, but cannot receive and store the first data. In the ROM, programs that are essential to the system operations such as the system's OS are stored.

The second memory 28 receives and stores the third data from the processor bus connection apparatus 25 through the asynchronous bus, or transfers the fourth data to the processor bus connection apparatus 25 through the asynchronous bus. Similar to the first memory, the RAM, the flash memory, or the like may be used as the second memory.

As described above, the input apparatus 24 receives the input data from the user and transfers the received input data to the processor bus connection apparatus 25 through the synchronous bus. The output apparatus 29 receives the output data form the processor bus connection apparatus 25 through the asynchronous bus and outputs the received output data to the user or receives the third data from the second memory 28 through the asynchronous bus and outputs the received third data to the user. The received output data or the received third data are display data in most cases. Particularly in this case, the output apparatus 29 is a display apparatus. Also, in that the second memory 28 stores display data, the second memory 28 is referred to as a display memory. In most display apparatuses, a 2-dimensional (2D) graphic accelerator or 3-dimensional (3D) graphic accelerator is installed. The 2D graphic accelerator is a hardware module which performs part of a process for displaying 2D graphic data that is usually performed by software. The 2D graphic accelerator reduces the burden on the processor and raises the execution speed. Going further, the 3D graphic accelerator is a module which adds a z-axis to the basic x and y-axes to process graphic data when the graphic data are displayed. That is, the graphic accelerator receives a command from a processor, and by performing the received command, writes display data in the second memory. For those commands which cannot be performed by the graphic accelerator, the processor performs the commands and writes display data in the second memory by itself.

In most cases, a scaler is attached to a display apparatus. The scaler converts the output data into data appropriate to the size of a display panel.

The synchronous bus and asynchronous bus operate respectively. That is, while the synchronous bus operates geared to the processor, the asynchronous bus operates irrespective of the clock of the processor. Accordingly, an apparatus for controlling the synchronous bus and an apparatus for controlling the asynchronous bus need to be prepared respectively. The synchronous bus control apparatus 22 plays a role of permitting the use of the synchronous bus so that a plurality of apparatuses can smoothly use the synchronous bus. In the same manner, the asynchronous bus control apparatus 27 plays a role of permitting the use of the asynchronous bus so that a plurality of apparatuses can smoothly use the asynchronous bus.

When the synchronous bus control apparatus 22 and the asynchronous bus control apparatus 27 are considered, the processor bus connection apparatus 25 receives the input data from the input apparatus 24 through the synchronous bus for which the synchronous bus control apparatus 22 gives the input apparatus 24 permission to use, and transfers the received input data to the processor 21. Also, the processor bus connection apparatus 25 receives the first data from the processor 21, and transfers the received first data to the first memory 23 through the synchronous bus for which the synchronous bus control apparatus 22 gives the processor bus connection apparatus 25 permission to use. Further, the processor bus connection apparatus 25 receives the second data from the first memory 23 through the synchronous bus for which the synchronous bus control apparatus 22 gives the first memory 23 permission to use, and transfers the received second data to the processor 21. In addition, the processor bus connection apparatus 25 receives and stores the third data from the processor 21 and transfers the stored third data to the second memory 28 through the asynchronous bus for which the asynchronous bus control apparatus 27 gives the processor bus connection apparatus 25 permission to use. Also, the processor bus connection apparatus 25 receives and stores the fourth data from the second memory 28 through the asynchronous bus for which the asynchronous bus control apparatus 27 gives the second memory 28 permission to use. Also, the processor bus connection apparatus 25 receives and stores the output data from the processor 21 and transfers the stored output data to the output apparatus through the asynchronous bus for which the asynchronous bus control apparatus 27 gives the processor bus connection apparatus 25 permission to use.

Further, the first memory 23 receives and stores the first data from the processor bus connection apparatus 25 through the synchronous bus for which the synchronous bus control apparatus 22 gives the processor bus connection apparatus 25 permission to use, or transfers the second data to the processor bus connection apparatus 25 through the synchronous bus for which the synchronous bus control apparatus 22 gives the first memory 23 permission to use.

In addition, the second memory 28 receives and stores the first data or the third data from the processor bus connection apparatus 25 through the asynchronous bus for which the asynchronous bus control apparatus 27 gives the processor bus connection apparatus 25 permission to use, or transfers the fourth data to the processor bus connection apparatus 25 through the asynchronous bus for which the asynchronous bus control apparatus 27 gives the second memory 28 permission to use.

Even further, the input apparatus 24 receives the input data from the user, and transfers the received input data to the processor bus connection apparatus 25 through the synchronous bus for which the synchronous bus control apparatus 22 gives the input apparatus 24 permission to use. The output apparatus 29 receives the output data from the processor bus connection apparatus 25 through the asynchronous bus for which the asynchronous bus control apparatus 27 gives the processor bus connection apparatus 25 permission to use and outputs the received output data to the user, or receives the third data from the second memory 28 through the asynchronous bus for which the asynchronous bus control apparatus 27 gives the second memory 28 permission to use and outputs the received third data to the user.

The bridge DMA 26 receives the second data from the first memory 23 through the synchronous bus, and transfers the received second data to the second memory 28 through the asynchronous bus. Also, the bridge DMA 26 receives the fourth data from the second memory 28 through the asynchronous bus, and transfers the received fourth data to the first memory 23 through the synchronous bus. Since the bridge DMA 26 transfers data in a DMA method, the bridge DMA 26 transfers data directly between the first memory 23 and the second memory 28 without passing through the processor 21. Furthermore, the bridge DMA 26 can transfer data directly between the first memory 23 and the second memory 28, and the input apparatus 24 and the output apparatus 29. For example, if the first memory is used to store video data among display data and the second memory is used to store graphics data, the video data stored in the first memory is transferred to the second memory through the bridge DMA and then is displayed. In addition, if an application which uses the first memory as a working space needs the data stored in the second memory, the data stored in the second memory can be transferred to the first memory through the bridge DMA.

When the bridge DMA 26 is considered, the first memory 23 receives and stores the first data from the processor bus connection apparatus 25 through the synchronous bus, or receives and stores the fourth data from the bridge DMA 26 through the synchronous bus. Also, the first memory 23 transfers the second data to the processor bus connection apparatus 25 or the bridge DMA 26 through the synchronous bus. Also, the second memory 28 receives and stores the third data from the processor bus connection apparatus 25 through the asynchronous bus, or receives and stores the second data from the bridge DMA 26 through the asynchronous bus. Also, the second memory 28 transfers the fourth data to the processor bus connection apparatus 25 or the bridge DMA 26 through the asynchronous bus. Further, the output apparatus 29 receives the output data through the asynchronous bus and transfers the received output data to the user, or receives the third data from the second memory through the asynchronous bus and outputs the received third data to the user, or receives the first data from the bridge DMA 26 through the asynchronous bus and outputs the received first data to the user.

Figure 3:
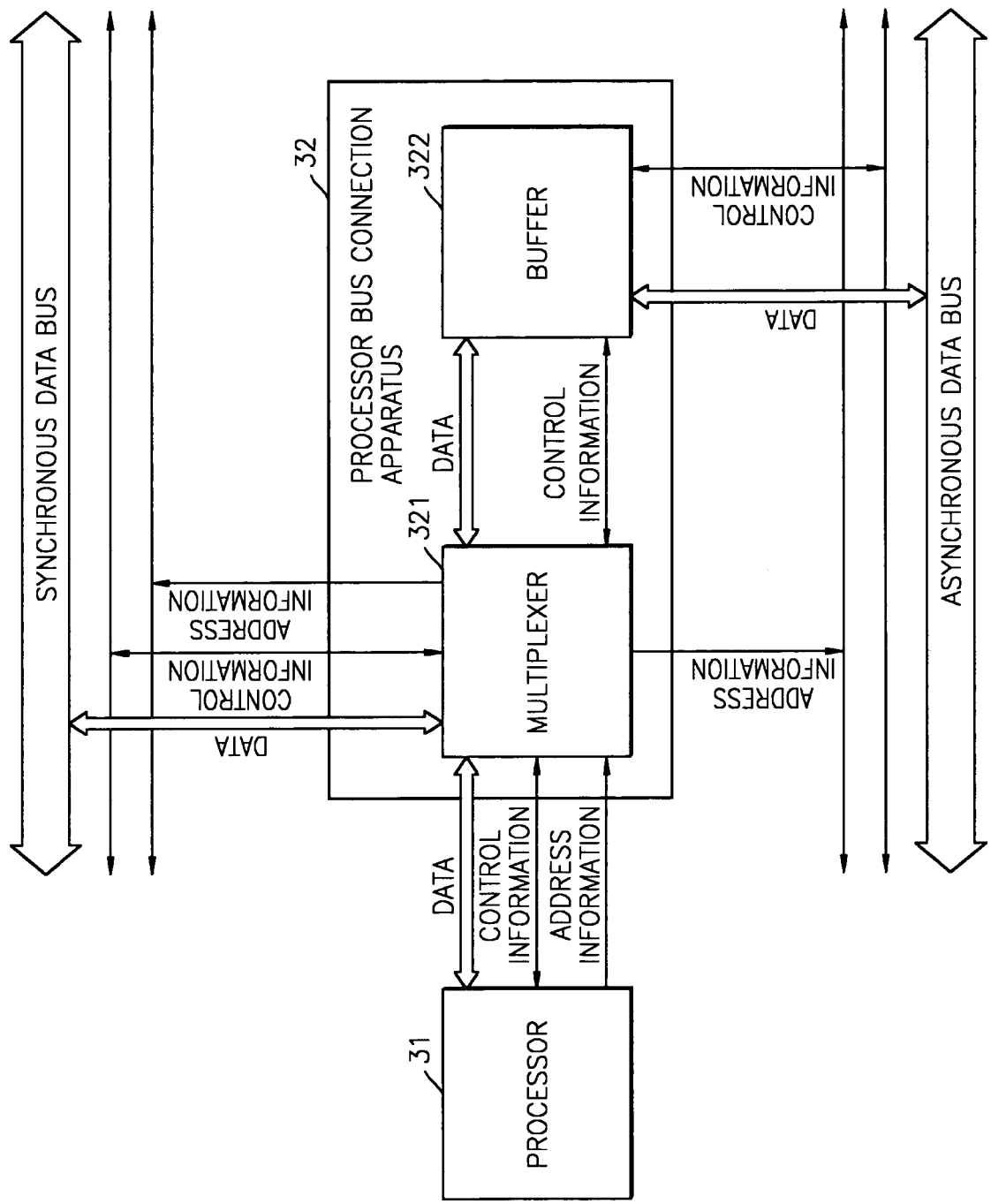
FIG. 3 is a detailed diagram of the structure of a processor bus connection apparatus of FIG. 2.

FIG. 3 is a detailed diagram of the structure of a processor bus connection apparatus such as that of processor bus connection apparatus 25 of FIG. 2.

The processor bus connection apparatus 32 comprises a multiplexer 321 and a buffer 322.

If a processor wants to write data in or read data from a memory, address information which indicates the address of a location where data is stored in the memory, and control information which indicates whether the operation is to read or to write should be input. At this time, since there are many peripheral apparatuses communicating data with the processor, a bus which is a common transfer channel of the processor and a plurality of peripheral apparatuses are used. Generally, data are transferred through a data bus, control information is transferred through a control bus, and address information is transferred through an address bus. Since the present invention relates to displaying data irrespective of the clock of a processor when the amount of display data is great, explanation will be limited to the data bus. However, this does not mean to limit the application of the present invention, which can be applied to the control bus and address bus.

A bus control apparatus controls traffic between the processor and the plurality of peripheral apparatuses by classifying data transferred by each peripheral apparatus and data transferred to each peripheral apparatus, so that the data can be smoothly transferred between the processor and the peripheral apparatuses. When the processor communicates data with the peripheral apparatuses through the bus, control information and address information are transferred and received based on the clock of the processor and therefore the processor, the bus, the bus control apparatus, and the peripheral apparatuses should be synchronized with the clock. According to the present invention, in order to reduce the burden on the bus and to operate irrespective of the clock of the processor, the second memory or the output apparatus is connected to the asynchronous data bus which is not synchronized with the processor. Whether data is transferred through the synchronous data bus or the asynchronous data bus is determined by the destination of the data, that is, the address information which is output from the processor.

If the multiplexer 321 receives address information, which indicates the address of the first memory connected to the synchronous data bus synchronized with the processor 31, from the processor 31, the multiplexer 321 receives the first data from the processor 31 and transfers the received first data to the first memory through the synchronous data bus, or receives the second data from the first memory through the synchronous data bus and transfers the received second data to the processor 31. If the multiplexer 321 receives address information, which indicates the address of the second memory connected to the asynchronous data bus not synchronized with the processor 31, from the processor 31, the multiplexer 321 receives the third data from the processor 31 and transfers the data to the buffer 322, or receives the fourth data from the buffer 322 and transfers the data to the processor 31. As described above, since data can be read from and written in the first memory connected to the synchronous data bus as in the related art, but without using additional apparatuses, the processor is directly connected to the synchronous data bus. However, since data cannot be read from and written in the second memory connected to the asynchronous data bus in accordance with the clock of the processor, a buffer 322 is placed between the processor 31 and the asynchronous data bus.

The buffer 322 receives and stores the third data from the multiplexer 321 and transfers the stored third data to the second memory through the asynchronous data bus or receives and stores the fourth data from the second memory through the asynchronous data bus and transfers the stored fourth data to the multiplexer 321. As described above, since the asynchronous data bus operates irrespective of the data input/output speed of the processor 31, the processor 31 cannot be connected directly to the asynchronous data bus for data transfer. Accordingly, buffer 322 is placed so that the third data or the fourth data can be transferred through the asynchronous data bus irrespective of the clock of the processor 31.

Figure 4:
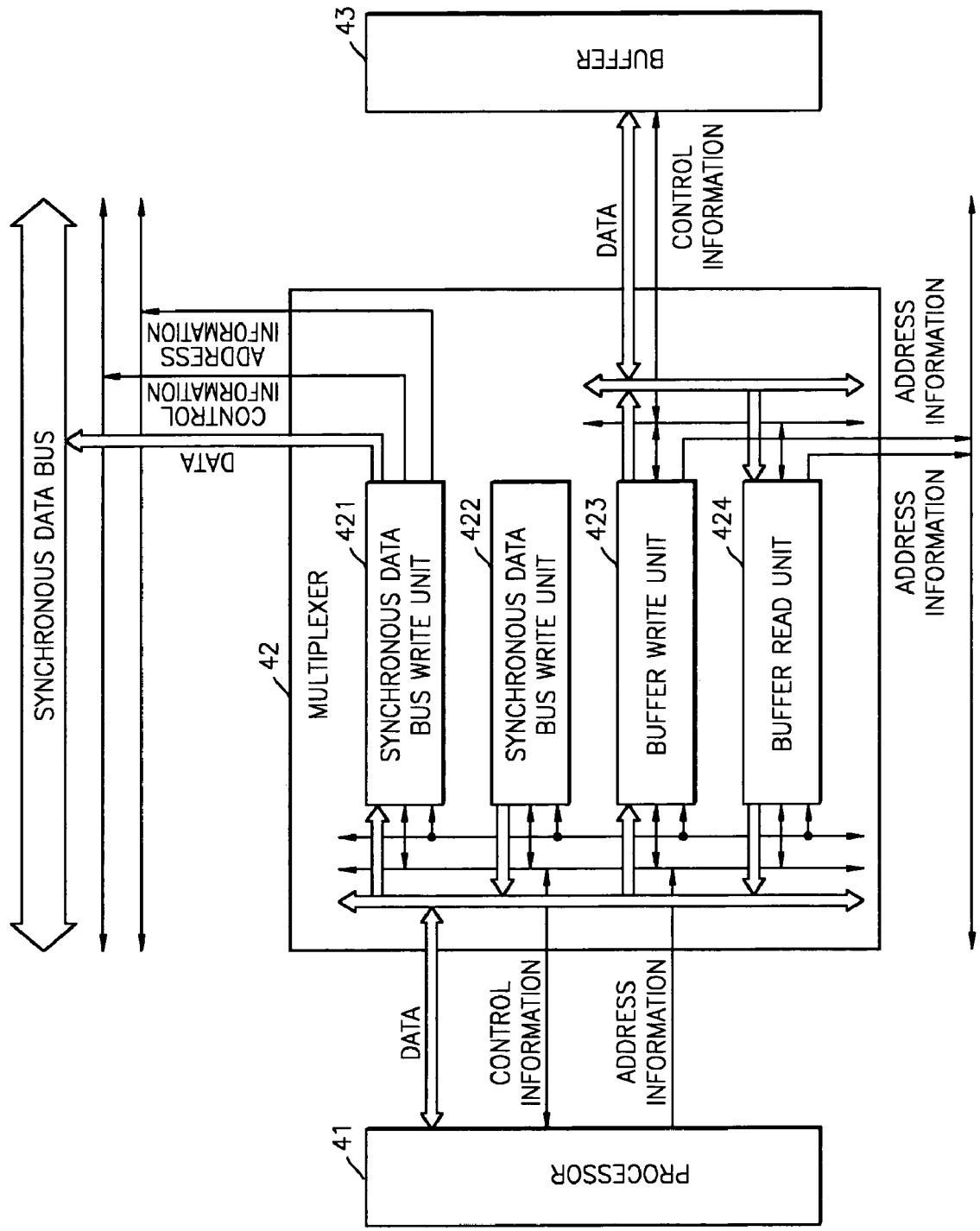
FIG. 4 is a detailed diagram of the structure of a multiplexer of FIG. 3.

FIG. 4 is a detailed diagram of the structure of a multiplexer like that of multiplexer 321 of FIG. 3.

The multiplexer 42 comprises a synchronous data bus write unit 421, a synchronous data bus read unit 422, a buffer write unit 423, and a buffer read unit 424.

If the synchronous data bus write unit 421 receives address information, which indicates the address of the first memory connected to the synchronous data bus synchronized with the processor 41, from the processor 41 and receives control information indicating a request for writing in the first memory, from the processor 41, the synchronous data bus write unit 421 receives the first data from the processor 41 and transfers the received first data to the first memory through the synchronous data bus. Since the address information indicating the address of the first memory connected to the synchronous data bus is provided by the processor 41, it can be known that data should be transferred or received through the synchronous data bus, and since the control information indicating a request for writing in the first memory is provided by the processor 41, it can be known that data should be transferred to the first memory.

If the synchronous data bus read unit 422 receives address information, which indicates the address of the first memory, from the processor 41, and receives control information indicating a request for reading from the first memory, from the processor 41, the synchronous data bus read unit 422 receives the second data from the first memory through the synchronous data bus and transfers the received data to the processor 41. Since the address information indicating the address of the first memory connected to the synchronous data bus is provided by the processor 41, it can be known that data should be transferred or received through the synchronous data bus, and since the control information indicating a request for reading from the first memory is provided by the processor 41, it can be known that data from the first memory should be received.

If the buffer write unit 423 receives address information, which indicates the address of the second memory connected to the asynchronous data bus not synchronized with the processor 41, from the processor 41, and receives control information indicating a request for writing in the second memory, from the processor 41, the buffer write unit 423 receives the third data from the processor 41 and transfers the received third data to the buffer 43 connected to the asynchronous data bus. Since the address information indicating the address of the second memory connected to the asynchronous data bus is provided by the processor 41, it can be known that data should be transferred or received through the asynchronous data bus, and since the control information indicating a request for writing in the second memory is provided by the processor 41 and data cannot be transferred directly to the second memory, it can be known that data should be transferred to the buffer 43 connected to the asynchronous data bus.

If the buffer read unit 424 receives address information indicating the address of the second memory from the processor 41 and receives control information indicating a request for reading from the second memory, the buffer read unit 424 receives the fourth data from the buffer 43 and transfers the received fourth data to the processor 41. Since the address information indicating the address of the second memory connected to the asynchronous data bus is provided by the processor 41, it can be known that data should be transferred or received through the asynchronous data bus, and since the control information indicating a request for reading from the second memory is provided by the processor 41 and data from the second memory cannot be directly received, it can be known that data should be received by the buffer 43 connected to the asynchronous data bus.

Figure 5:
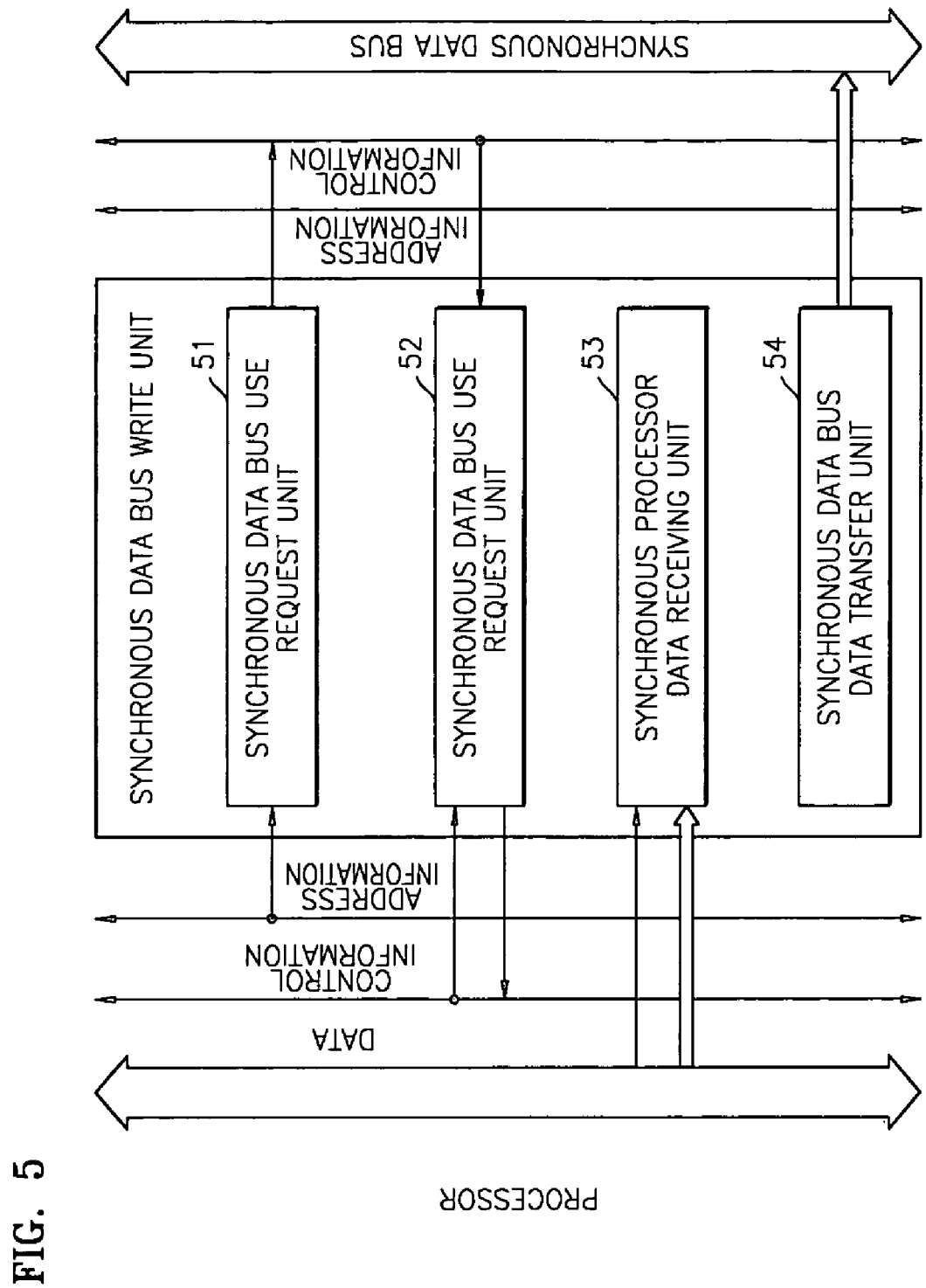
FIG. 5 is a detailed diagram of the structure of a synchronous data bus write unit of FIG. 4.

FIG. 5 is a detailed diagram of the structure of a synchronous data bus write unit such as that of FIG. 4.

The synchronous data bus write unit comprises a synchronous data bus use request unit 51, a synchronous processor data transfer request unit 52, a synchronous processor data receiving unit 53, and a synchronous data bus data transfer unit 54.

If the synchronous data bus use request unit 51 receives address information indicating the address of the first memory from the processor, the synchronous data bus use request unit 51 generates control information indicating a request for using the synchronous data bus and transfers the control information to the synchronous data bus control apparatus which controls the synchronous data bus. If address information indicating the address of the first memory is provided by the processor, data should be transferred or received through the synchronous data bus and therefore it should be checked first whether the synchronous data bus is used by any other apparatus. For this, the synchronous data bus use request unit 51 generates control information indicating a request for using the synchronous data bus and transfers the control information to the synchronous data bus control apparatus which controls the synchronous data bus. If the synchronous data bus control apparatus receives the control information indicating a request for using the synchronous data bus, the synchronous data bus control apparatus checks whether the synchronous data bus is used. If the synchronous data bus is used, the synchronous data bus control apparatus generates and transfers control information indicating a negative response on the use and, if the synchronous data bus is not used, generates and transfers control information indicating a positive response on the use.

If the synchronous processor data transfer request unit 52 receives the control information indicating the positive response on the use of the synchronous data bus, from the synchronous data bus control apparatus, and receives the control information indicating a request for writing in the first memory, from the processor, the synchronous processor data transfer request unit 52 generates control information indicating a request for transferring the first data and transfers the control information to the processor. Since the control information indicating the positive response on the use of the synchronous data bus is provided by the synchronous data bus control apparatus, it can be known that the synchronous data bus is not used. At this time, if the synchronous processor data transfer request unit 52 receives the control information indicating a request for writing in the first memory, from the processor, the synchronous processor data transfer request unit 52 generates a request for outputting data, that is, control information indicating a request for transferring the first data, and transfers the control information to the processor. If the processor receives the control information indicating a request for transferring the first data, the processor prepares to output the first data and if it is ready, generates and transfers control information indicating a positive response on the transfer of the first data.

If the synchronous processor data receiving unit 53 receives the control information indicating a positive response on the transfer of the first data, from the processor, the synchronous processor data receiving unit 53 receives the first data from the processor. Since the synchronous processor data receiving unit 53 receives the control information indicating a positive response on the transfer of the first data from the processor, it can be known that after that, the processor will transfer the first data. The synchronous processor data receiving unit 53 prepares to receive the first data and if the first data arrives, receives the first data.

The synchronous data bus data transfer unit 54 transfers the first data, which is received by the synchronous processor data receiving unit 53, to the first memory through the synchronous data bus.

Figure 6:
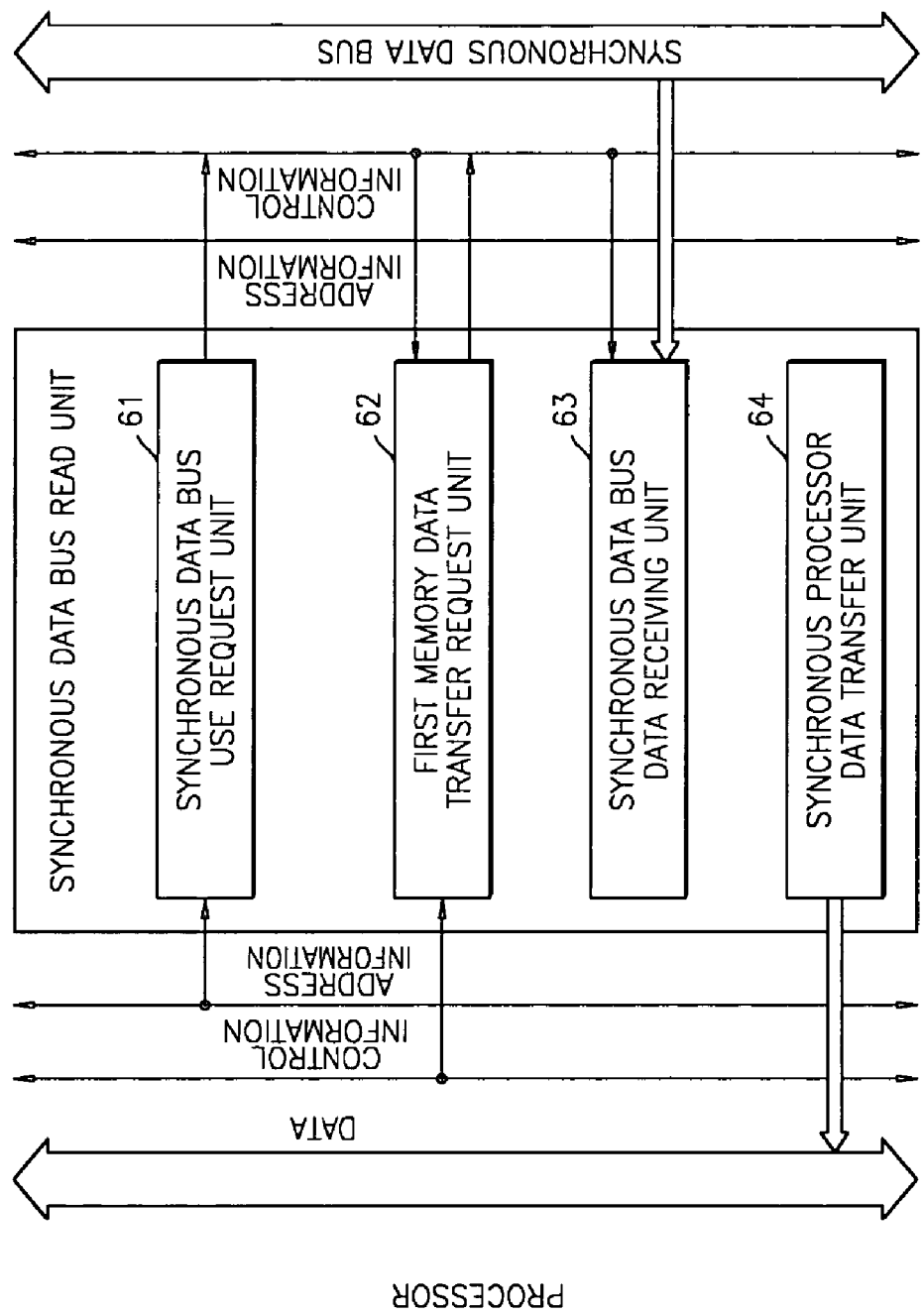
FIG. 6 is a detailed diagram of the structure of a synchronous data bus read unit of FIG. 4.

FIG. 6 is a detailed diagram of the structure of the synchronous data bus read unit of FIG. 4.

The synchronous data bus read unit comprises a synchronous data bus use request unit 61, a first memory data transfer request unit 62, a synchronous data bus data receiving unit 63, and a synchronous processor data transfer unit 64.

If the synchronous data bus use request unit 61 receives address information indicating the address of the first memory from the processor, the synchronous data bus use request unit 61 makes a request for using the synchronous data bus to the synchronous data bus control apparatus which controls the synchronous data bus. If address information indicating the address of the first memory is provided by the processor, data should be transferred or received through the synchronous data bus and therefore it should be checked first whether or not the synchronous data bus is used by any other apparatus. For this, control information indicating a request for using the synchronous data bus is generated and transferred to the synchronous data bus control apparatus, which controls the synchronous data bus. If the synchronous data bus control apparatus receives control information indicating a request for using the synchronous data bus, the synchronous data bus control apparatus checks whether or not the synchronous data is used. If the synchronous data bus is used by any other apparatus, the synchronous data bus control apparatus generates and transfers control information indicating a negative response on the use, and, if it is not used, generates and transfers a positive response on the use.

If the first memory data transfer request unit 62 receives control information indicating a positive response on the use of the synchronous data bus, from the synchronous data bus control apparatus and receives control information indicating a request for reading from the first memory, from the processor, the first memory data transfer request unit 62 generates and transfers control information indicating a request for transferring the second data. Since control information indicating a positive response on the use of the synchronous data bus is provided by the synchronous data bus control apparatus, it can be known that the synchronous data bus is not used. At this time, if the first memory data transfer request unit 62 receives control information indicating a request for reading from the first memory, from the processor, the first memory data transfer request unit 62 generates and transfers a request for outputting data, that is, control information indicating a request for transferring the second data, to the first memory. If the first memory receives control information indicating a request for transferring the second data, the first memory prepares to output the second data, and, if it is ready, generates and transfers control information indicating a positive response on the transfer of the second data.

If the synchronous data bus data receiving unit 63 receives control information indicating a positive response on the transfer of the second data from the first memory, the synchronous data bus data receiving unit 63 receives the second data from the first memory through the synchronous data bus. Since the synchronous data bus data receiving unit 63 receives control information indicating a positive response on the transfer of the second data from the first memory, it can be known that after that the first memory will transfer the second data. The synchronous data bus data receiving unit 63 prepares to receive the second data, and, if it arrives, receives the second data.

The synchronous processor data transfer unit 64 transfers the second data, which is received by the synchronous data bus data receiving unit 63, to the processor.

Figure 7:
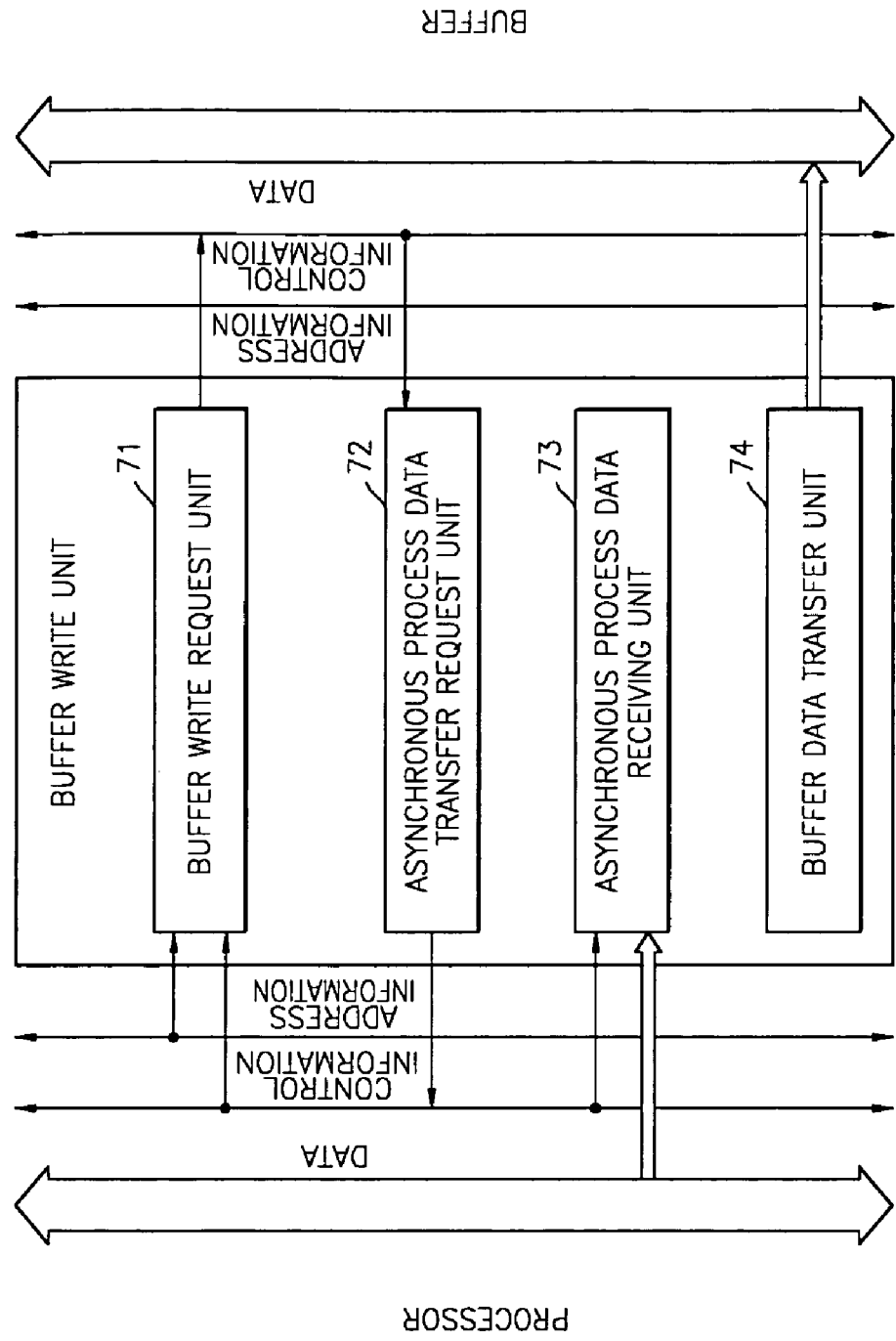
FIG. 7 is a detailed diagram of the structure of a buffer write unit of FIG. 4.

FIG. 7 is a detailed diagram of the structure of the buffer write unit of FIG. 4.

The buffer write unit comprises a buffer write request unit 71, an asynchronous processor data transfer request unit 72, an asynchronous processor data receiving unit 73, and a buffer data transfer unit 74.

If the buffer write request unit 71 receives address information indicating the address of the second memory, from the processor, and receives control information indicating a request for writing in the second memory, from the processor, the buffer write request unit 71 generates control information indicating a request for writing in the buffer and transfers the control information to the buffer connected to the asynchronous bus. If address information indicating the address of the second memory and control information indicating a request for writing in the second memory are provided by the processor, data should be transferred to the second memory through the asynchronous data bus and therefore it should be checked first whether or not the buffer is empty. For this, the buffer write request unit 71 generates control information indicating a request for writing in the buffer and transfers the control information to the buffer. If the buffer receives the control information indicating a request for writing in the buffer, the buffer checks whether or not the buffer is empty. If the buffer is not empty, the buffer generates and transfers control information indicating a negative response on the write, and if the buffer is empty, generates and transfers control information indicating a positive response on the write.

If the asynchronous processor data transfer request unit 72 receives a positive response on the write in the buffer, from the buffer, the asynchronous processor data transfer request unit 72 generates control information indicating a request for transferring the third data and transfers the control information to the processor. Since control information indicating a positive response on the write in the buffer is provided by the buffer, it can be known that the buffer is empty. At this time, the asynchronous processor data transfer request unit 72 generates a request for outputting data, that is, control information indicating a request for transferring the third data, and transfers the control information to the processor. If the processor receives the control information indicating a request for transferring the third data, the processor prepares to output the third data, and, if it is ready, generates and transfers control information indicating a positive response on the transfer of the third data.

If the asynchronous processor data receiving unit 73 receives control information indicating a positive response on the transfer of the third data, from the processor, the asynchronous processor data receiving unit 73 receives the third data from the processor. Since the asynchronous processor data receiving unit 73 receives control information indicating a positive response on the transfer of the third data from the processor, it can be known that after that, the processor will transfer the third data. The asynchronous processor data receiving unit 73 prepares to receive the third data and, if the third data arrives, receives the third data.

The buffer data transfer unit 74 transfers the third data, which is received by the asynchronous processor data receiving unit 73, to the buffer.

Figure 8:
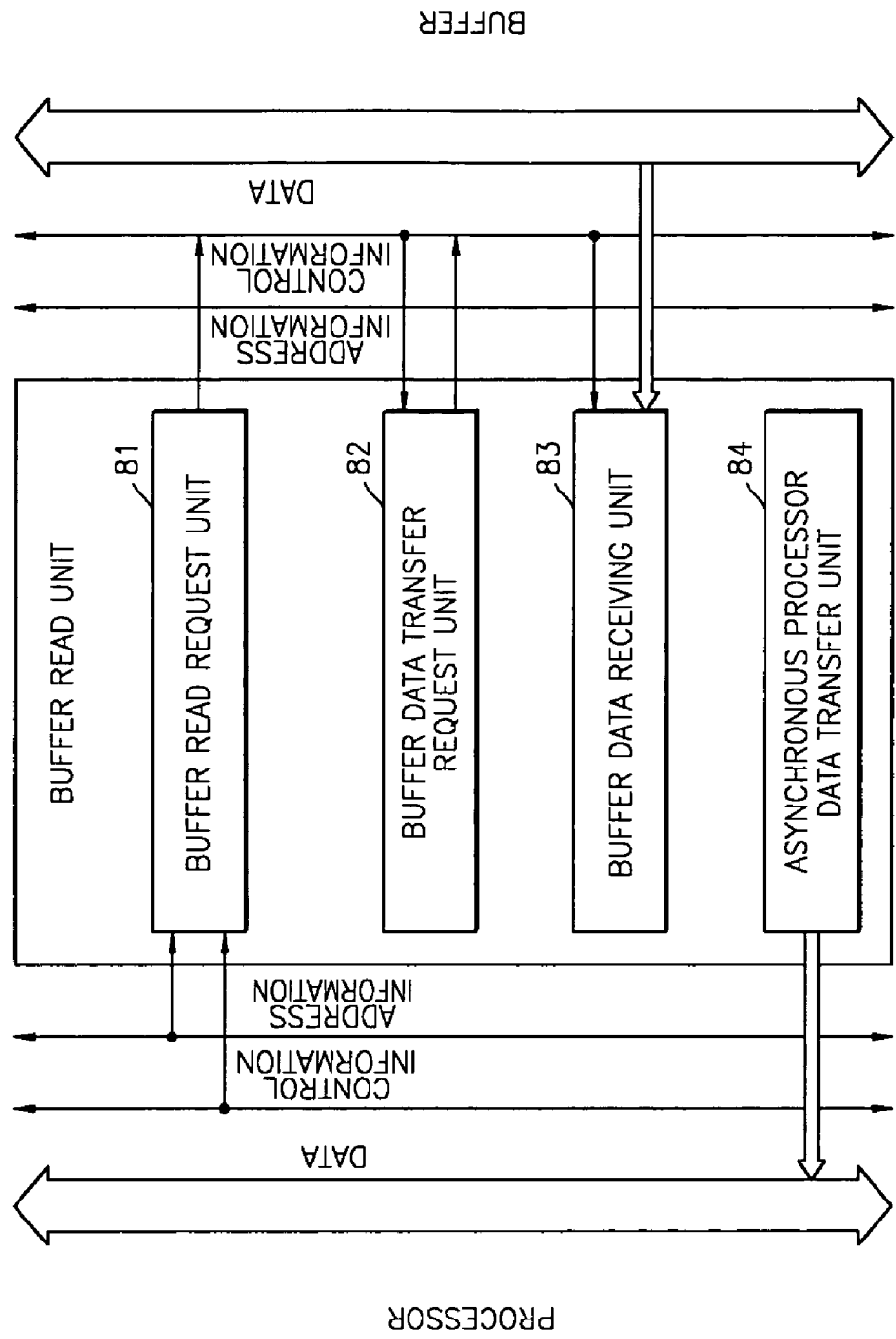
FIG. 8 is a detailed diagram of the structure of a buffer read unit of FIG. 4.

FIG. 8 is a detailed diagram of the structure of the buffer read unit of FIG. 4.

The buffer read unit comprises a buffer read request unit 81, a buffer data transfer request unit 82, a buffer data receiving unit 83, and an asynchronous processor data transfer unit 84.

If the buffer read request unit 81 receives address information indicating the address of the second memory, from the processor, and receives control information indicating a request for reading from the second memory, from the processor, the buffer read request unit 81 generates control information indicating a request for reading from the buffer and transfers the control information to the buffer connected to the asynchronous data bus. If address information indicating the address of the second memory are control information indicating a request for reading from the second memory are provided by the processor, data from the second memory should be received through the asynchronous data bus and therefore it should be checked first whether or not the buffer stores data. For this, the buffer read request unit 81 generates control information indicating a request for reading from the buffer and transfers the control information to the buffer. If the buffer receives control information indicating a request for reading from the buffer, it is checked whether or not data is stored in the buffer. If data is not stored in the buffer, the buffer generates and transfers control information indicating a negative response on the read, and, if data is stored, generates and transfers control information indicating a positive response on the read.

If the buffer data transfer request unit 82 receives control information indicating a positive response on the read of the buffer, from the buffer, the buffer data transfer request unit 82 generates control information indicating a request for transferring the fourth data and transfers the control information to the buffer. Since control information indicating a positive response on the read of the buffer is provided by the buffer, it can be known that data is stored in the buffer. At this time, the buffer data transfer request unit 82 generates a request for outputting data, that is, control information indicating a request for transferring the fourth data, and transfers the control information to the buffer. If the buffer receives control information indicating a request for transferring the fourth data, the buffer prepares to output the fourth data, and, if it is ready, generates and transfers control information indicating a positive response on the transfer of the fourth data.

If the buffer data receiving unit 83 receives control information indicating a positive response on the transfer of the fourth data from the buffer, the buffer data receiving unit 83 receives the fourth data from the buffer. Since the buffer data receiving unit 83 receives control information indicating a positive response on the transfer of the fourth data from the buffer, it can be known that after that, the buffer will transfer the fourth data. The buffer data receiving unit 83 prepares to receive the fourth data, and, if the fourth data arrives, receives the fourth data.

The asynchronous processor data transfer unit 84 transfers the fourth data, which is received by the buffer data receiving unit 83, to the processor.

Figure 9:
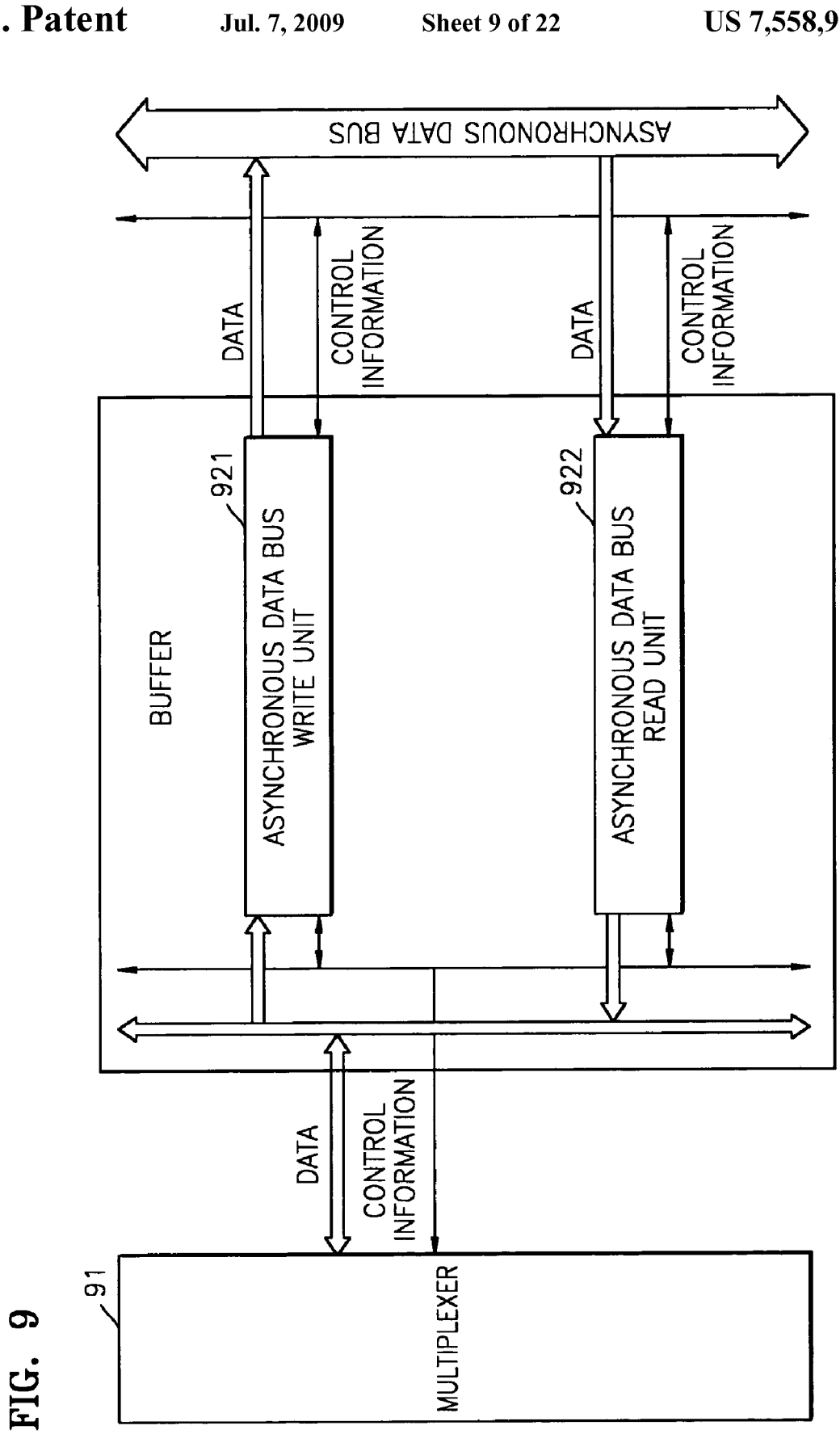
FIG. 9 is a detailed diagram of the structure of the buffer of FIG. 3.

FIG. 9 is a detailed diagram of the structure of the buffer of FIG. 3.

The buffer comprises an asynchronous data bus write unit 921 and an asynchronous data bus read unit 922.

If the asynchronous data bus write unit 921 receives control information indicating a request for writing in the buffer connected to the asynchronous data bus which is not synchronized with the processor, from the multiplexer connected to the processor, the asynchronous data bus write unit 921 receives and stores the third data from the multiplexer, and transfers the stored third data to the second memory through the asynchronous data bus. Since control information indicating a request for writing in the buffer connected to the asynchronous data bus is provided by the multiplexer 91, it can be known that data should be transferred to the second memory connected to the asynchronous data bus.

If the asynchronous data bus read unit 922 receives control information indicating a request for reading from the buffer, from the multiplexer, the asynchronous data bus read unit 922 receives the fourth data from the second memory through the asynchronous data bus, stores the fourth data, and transfers the stored fourth data to the multiplexer. Since control information indicating a request for reading from the buffer connected to the asynchronous data bus is provided by the multiplexer, it can be known that data from the second memory connected to the asynchronous data bus should be received.

Figure 10:
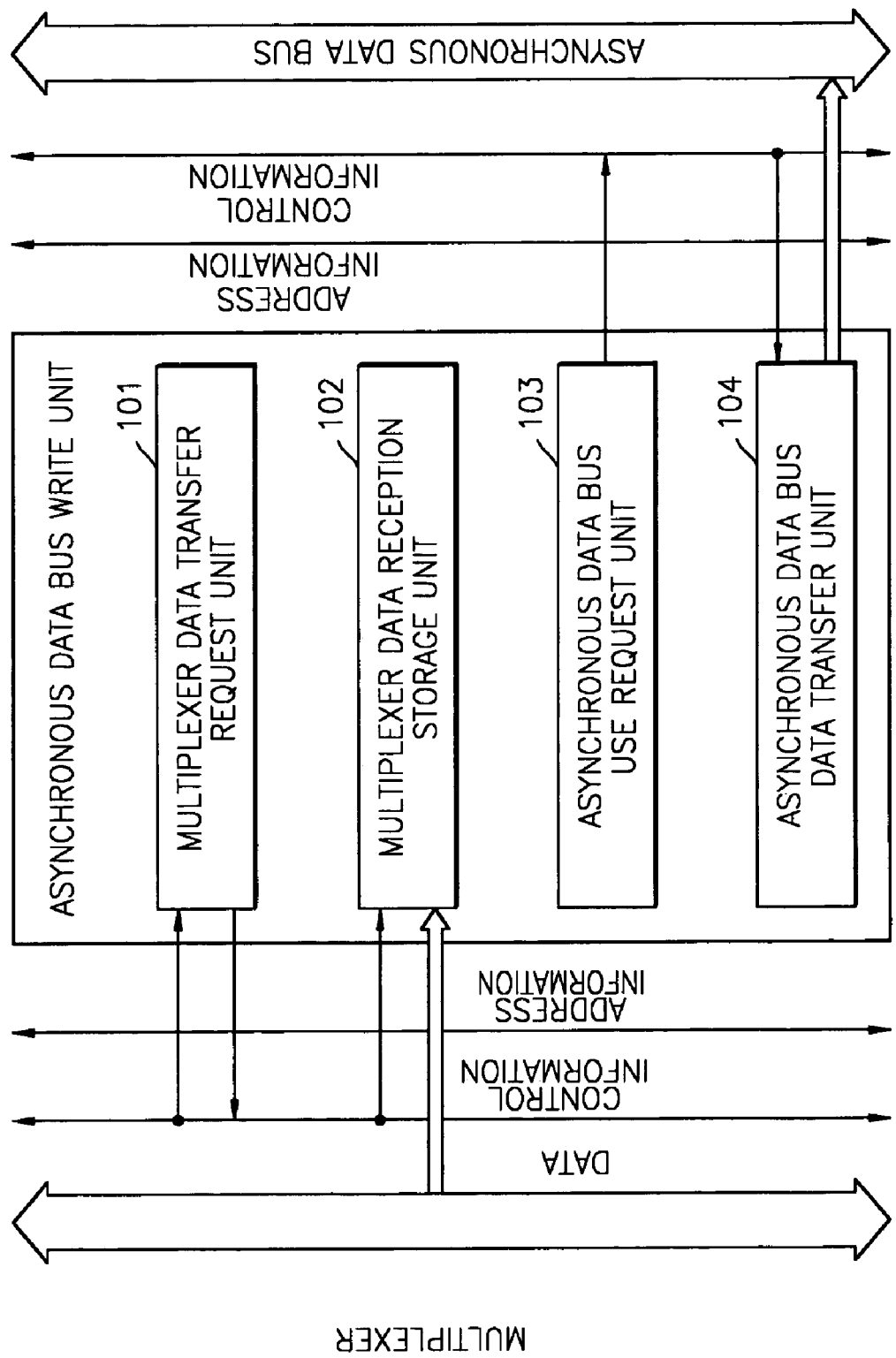
FIG. 10 is a detailed diagram of the structure of an asynchronous data bus write unit of FIG. 9.

FIG. 10 is a detailed diagram of the structure of the asynchronous data bus write unit of FIG. 9.

The asynchronous data bus write unit comprises a multiplexer data transfer request unit 101, a multiplexer data reception storage unit 102, an asynchronous data bus use request unit 103, and an asynchronous data bus data transfer unit 104.

If the multiplexer data transfer request unit 101 receives control information indicating a request for writing in the buffer, from the multiplexer connected to the processor, and there is space enough to store the third data, the multiplexer data transfer request unit 101 generates control information indicating a request for transferring the third data and transfers the control information to the multiplexer. If control information indicating a request for writing in the buffer is provided by the multiplexer, it should be checked whether or not there is space in the buffer to store the third data desired to be written in the buffer. If there is space to store the third data in the buffer, the multiplexer data transfer request unit 101 generates control information indicating a positive response on the write in the buffer, and transfers the control information to the multiplexer. If the multiplexer receives control information indicating a positive response on the write in the buffer, the multiplexer generates a request for outputting data, that is, control information indicating a request for transferring the third data, and transfers the control information to the processor. If the processor transfers the third data, the multiplexer receives the third data and transfers to the buffer.

The multiplexer data reception storage unit 102 receives and stores the third data from the multiplexer.

If the third data is stored in the multiplexer data reception storage unit 102, the asynchronous data bus use request unit 103 generates control information indicating a request for using the asynchronous data bus, and transfers the control information to the asynchronous data bus control apparatus which controls the asynchronous data bus. If storing the third data in the multiplexer data reception storage unit 102 is finished, data should be transferred through the asynchronous data bus and therefore, it should be checked first whether or not the asynchronous data bus is used by any other apparatus. For this, the asynchronous data bus use request unit 103 generates control information indicating a request for using the asynchronous data bus and transfers the control information to the asynchronous data bus control apparatus which controls the asynchronous data bus. If the asynchronous data bus control apparatus receives control information indicating a request for using the asynchronous data bus, the asynchronous data bus checks whether or not the asynchronous data bus is used. If the asynchronous data bus is used, the asynchronous data bus control apparatus generates and transfers control information indicating a negative response on the use, and, if it is not used, generates and transfers control information indicating a positive response on the use.

If the asynchronous data bus data transfer unit 104 receives control information indicating a positive response on the use of the asynchronous data bus from the asynchronous data bus control apparatus, the asynchronous data bus data transfer unit 104 transfers the third data stored in the multiplexer data reception storage unit, to the second memory through the asynchronous data bus.

Figure 11:
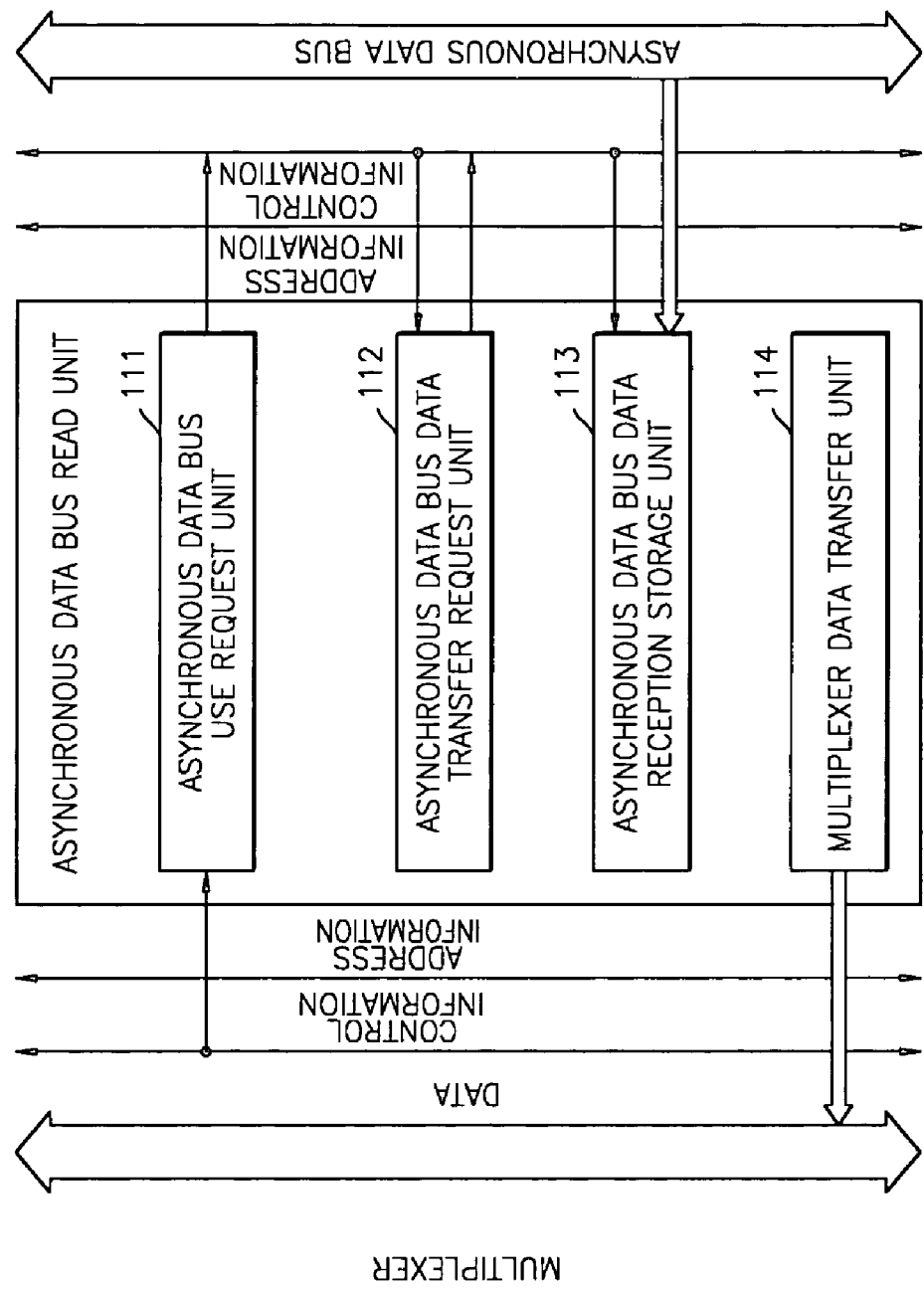
FIG. 11 is a detailed diagram of the structure of an asynchronous data bus read unit of FIG. 9.

FIG. 11 is a detailed diagram of the structure of the asynchronous data bus read unit of FIG. 9.

The asynchronous data bus read unit comprises an asynchronous data bus use request unit 111, an asynchronous data bus data transfer request unit 112, an asynchronous data bus data reception storage unit 113, and a multiplexer data transfer unit 114.

If the asynchronous data bus use request unit 111 receives control information indicating a request for reading from the buffer, from the multiplexer connected to the processor and there is a space to store the fourth data, the asynchronous data bus use request unit 111 generates control information indicating a request for using the asynchronous data bus and transfers the control information to the asynchronous data bus control apparatus which controls the asynchronous data bus. If control information indicating a request for reading from the buffer is provided by the multiplexer, it should be checked whether or not there is space in the buffer to store the fourth data desired to be written in the buffer. If there is space to store the third data in the buffer, data should be received through the asynchronous data bus and therefore it should be checked first whether or not the asynchronous data bus is used by any other apparatus. For this, the asynchronous data bus use request unit 111 generates control information indicating a request for using the asynchronous data bus, and transfers the control information to the asynchronous data bus control apparatus which controls the asynchronous data bus. If the asynchronous data bus control apparatus receives control information indicating a request for using the asynchronous data bus, the asynchronous data bus control apparatus checks whether or not the asynchronous data bus is used. If the asynchronous data bus is used, the asynchronous data bus control apparatus generates and transfers control information indicating a negative response on the use, and, if it is not used, generates and transfers control information indicating a positive response on the use.

If the asynchronous data bus data transfer request unit 112 receives control information indicating a positive response on the use of the asynchronous data bus from the asynchronous data bus control apparatus, the asynchronous data bus data transfer request unit 112 generates control information indicating a request for transferring the fourth data and transfers the control information to the asynchronous data bus control apparatus.

If the asynchronous data bus data reception storage unit 113 receives a positive response on the transfer of the fourth data from the asynchronous data bus control apparatus, the asynchronous data bus data reception storage unit 113 receives and stores the fourth data from the second memory through the asynchronous data bus.

If the fourth data is stored in the asynchronous data bus data reception storage unit 113, the multiplexer data transfer unit 114 generates and transfers control information indicating a positive response on the read of the buffer, and if control information indicating a request for transferring the fourth data is provided by the multiplexer, generates and transfers control information indicating a positive response on the transfer of the fourth data, and transfers the fourth data stored in the asynchronous data bus data reception storage unit 113. If the multiplexer receives control information indicating a positive response on the read of the buffer, the multiplexer generates a request for outputting data, that is, control information indicating a request for transferring the fourth data and transfers the control information to the buffer. If the buffer transfers the fourth data, the multiplexer receives the fourth data and transfers the fourth data to the processor.

Figure 12:
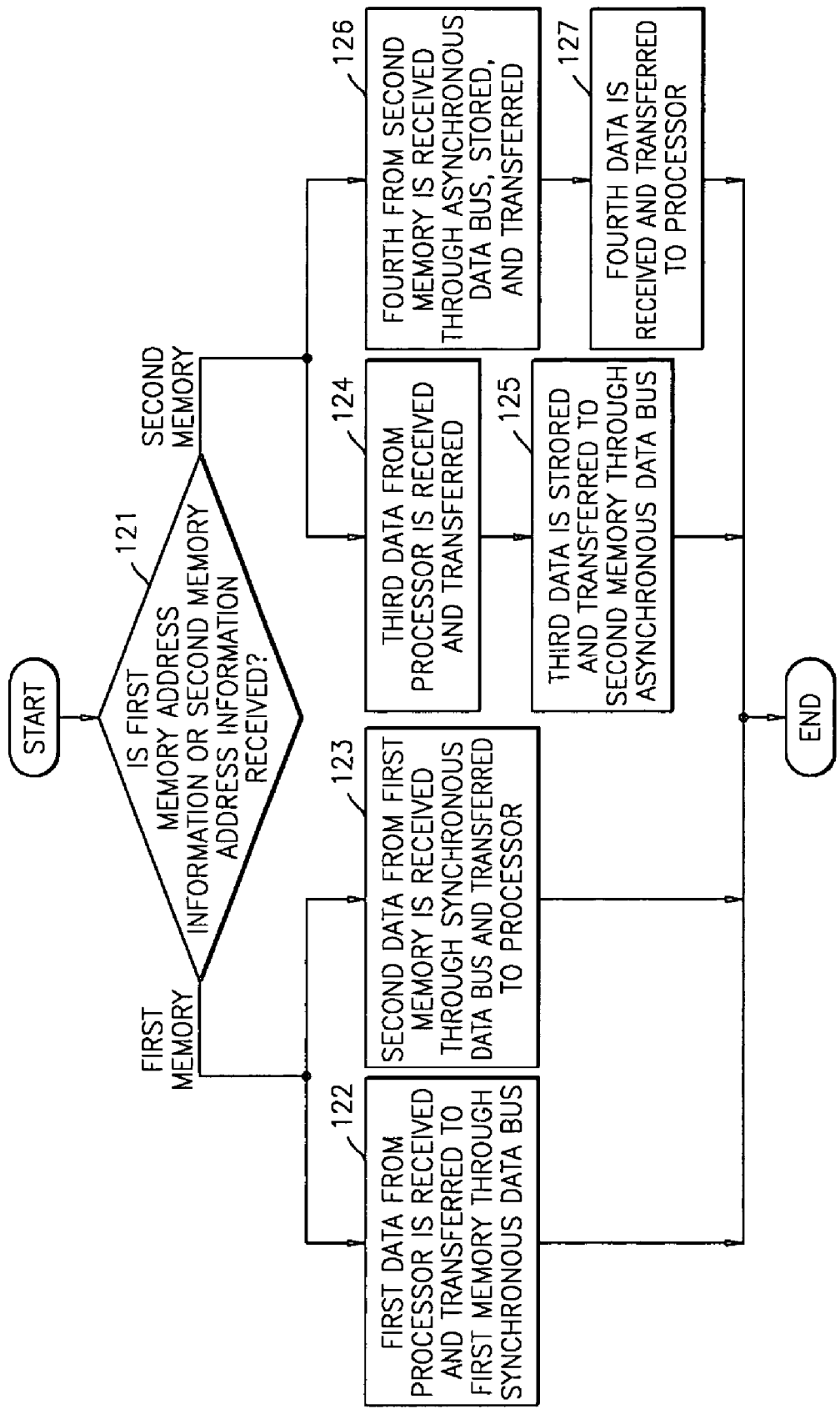
FIG. 12 is a flowchart of the steps performed by a processor bus connection method according to an exemplary embodiment of the present invention.

FIG. 12 is a flowchart of the steps performed by a processor bus connection method according to an exemplary embodiment of the present invention.

If address information indicating the address of the first memory connected to the synchronous data bus synchronized with the processor is provided by the processor in step 121, the first data from the processor is received and the received first data is transferred to the first memory through the synchronous data bus in step 122, or the second data from the first memory is received through the synchronous data bus and the received second data is transferred to the processor 123.

If address information indicating the address of the second memory connected to the asynchronous data bus not synchronized with the processor is provide by the processor in step 121, the third data from the processor is received and transferred in step 124 and the transferred third data is stored and transferred to the second memory through the asynchronous data bus in step 125, or the fourth data from the second memory is received through the asynchronous data bus and stored, and the stored fourth data is transferred in step 126 and the transferred fourth data is received and transferred to the processor in step 127.

Figure 13:
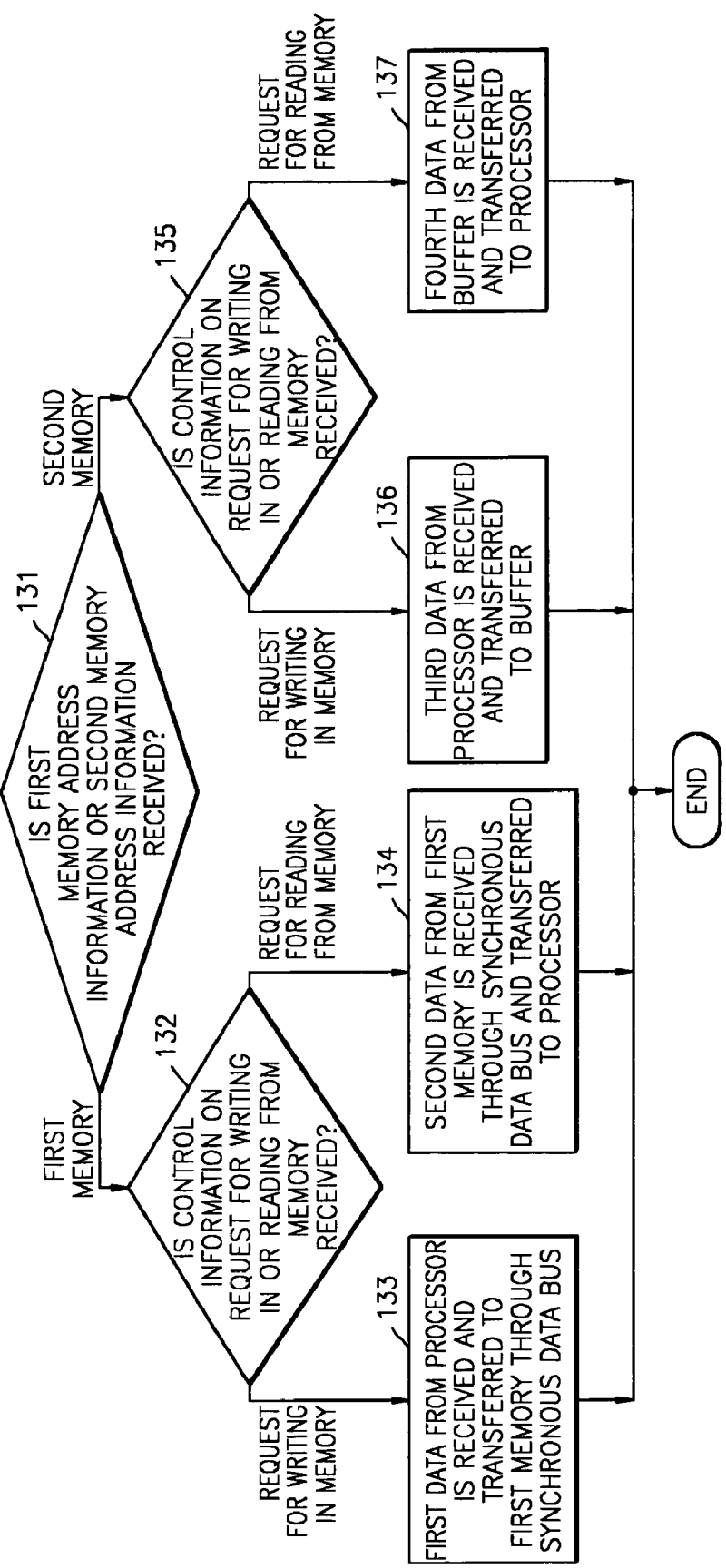
FIG. 13 is a flowchart of a multiplexing method according to an exemplary embodiment of the present invention.

FIG. 13 is a flowchart of a multiplexing method according to an exemplary embodiment of the present invention.

If address information indicating the address of the first memory connected to the synchronous data bus synchronized with the processor is provided by the processor in step 131 and control information indicating a request for writing in the first memory is provided by the processor in step 132, the first data from the processor is received and the received first data is transferred to the first memory through the synchronous data bus in step 133.

If address information indicating the address of the first memory is provided by the processor in step 131 and control information indicating a request for reading from the first memory is provided by the processor in step 132, the second data from the first memory is received through the synchronous data bus and the received data is transferred to the processor 134.

If address information indicating the address of the second memory connected to the asynchronous data bus not synchronized with the processor is provided by the processor in step 131 and control information indicating a request for writing in the second memory is provided by the processor in step 135, the third data from the processor is received and the received third data is transferred to the buffer connected to the asynchronous data bus in step 136.

If address information indicating the address of the second memory is provided by the processor in step 131 and control information indicating a request for reading from the second memory is provided by the processor in step 135, the fourth data from the buffer is received and the received fourth data is transferred to the processor in step 137.

Figure 14:
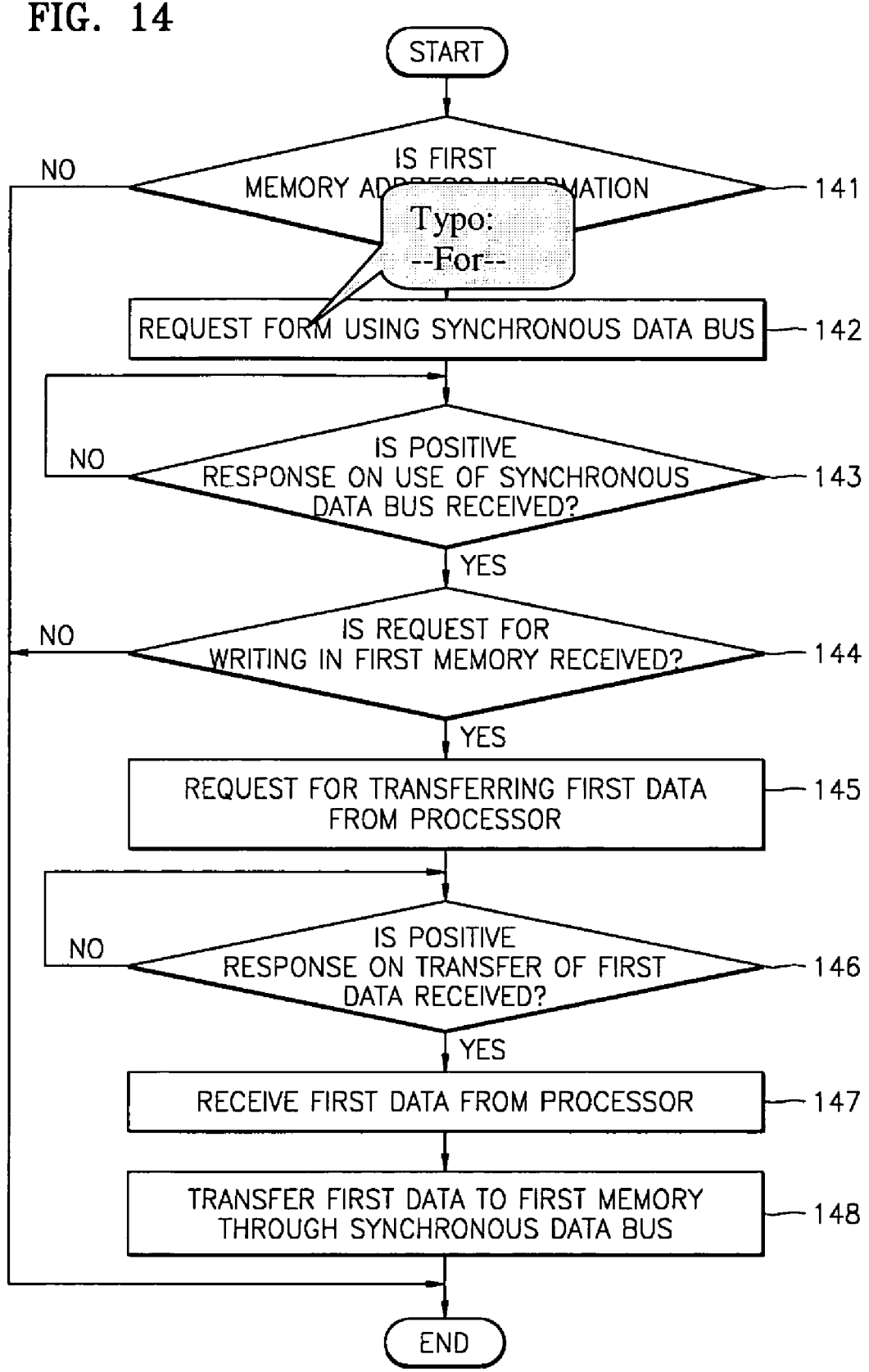
FIG. 14 is a detailed flowchart of steps 131, 132, and 133 of FIG. 13.

FIG. 14 is a detailed flowchart of steps 131, 132, and 133 of FIG. 13.

If address information indicating the address of the first memory is provided by the processor in step 141, control information indicating a request for using the synchronous data bus is generated and transferred to the synchronous data bus control apparatus which controls the synchronous data bus in step 142.

Then, if control information indicating a positive response on the use of the synchronous data bus is provided by the synchronous data bus control apparatus in step 143, and control information indicating a request for writing in the first memory is provided by the processor in step 144, control information indicating a request for transferring the first data is generated and transferred to the processor in step 145. Generally, the processor outputs address information and control information at the same time and therefore the steps 141 and 144 may be performed at the same time.

Then, if control information indicating a positive response on the transfer of the first data is provided by the processor in step 146, the first data from the processor is received in step 147. Then, the received first data is transferred to the first memory through the synchronous data bus in step 148.

Figure 15:
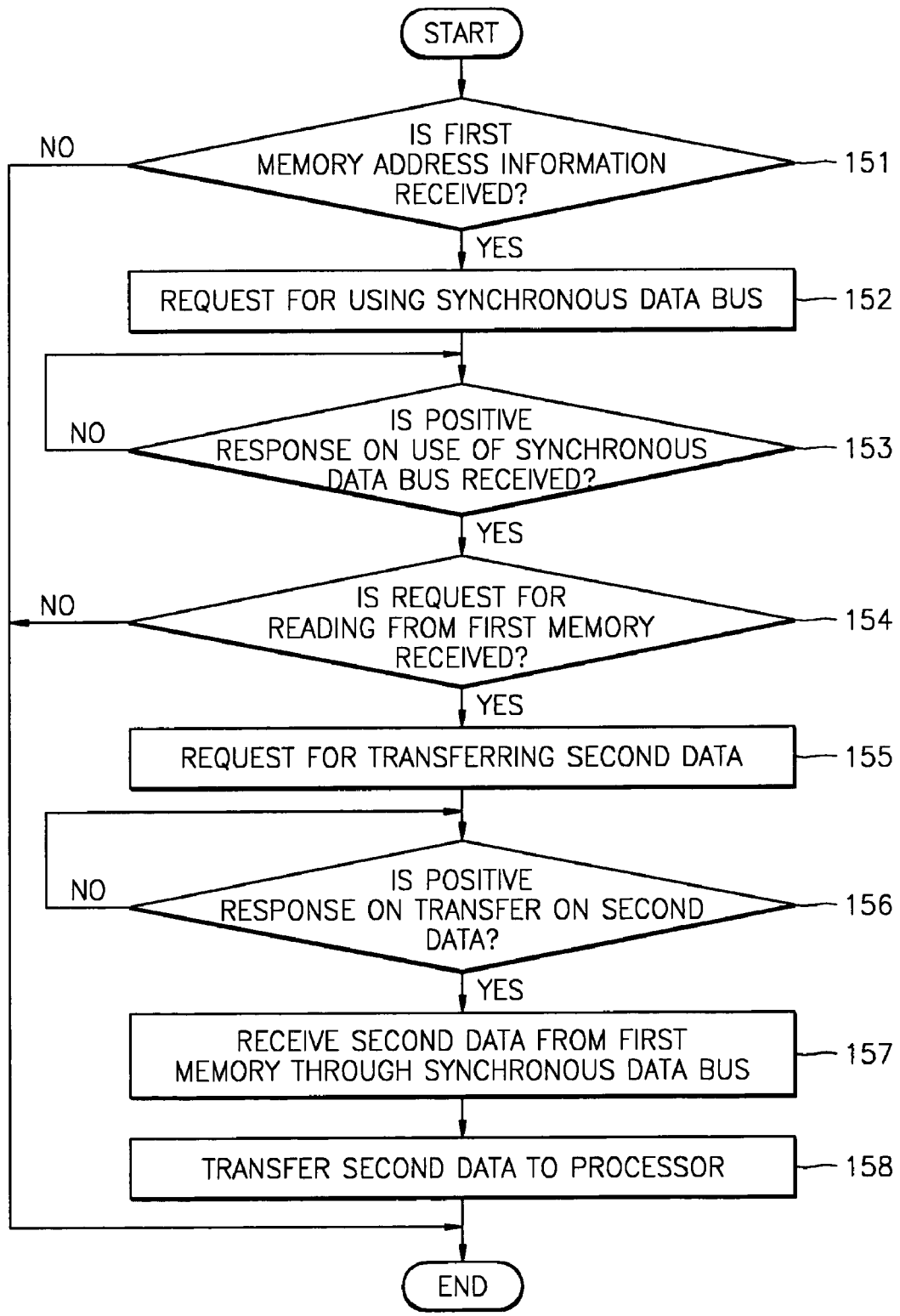
FIG. 15 is a detailed flowchart of steps 131, 132, and 134 of FIG. 13.

FIG. 15 is a detailed flowchart of steps 131, 132, and 134 of FIG. 13.

If address information indicating the address of the first memory is provided by the processor in step 151, a request for using the synchronous data bus is made to the synchronous data bus control apparatus which controls the synchronous data bus in step 152. Then, if control information indicating a positive response on the use of the synchronous data bus is provided by the synchronous data bus control apparatus in step 153 and control information indicating a request for reading from the first memory is provided by the processor in step 154, control information indicating a request for transferring the second data is generated and transferred to the first memory in step 155. Generally, the processor outputs address information and control information at the same time and therefore steps 151 and 154 may be performed at the same time. Then, if control information indicating a positive response on the transfer of the second data is provided by the first memory in step 156, the second data from the first memory is received through the synchronous data bus in step 157. Then, the received second data is transferred to the processor in step 158.

Figure 16:
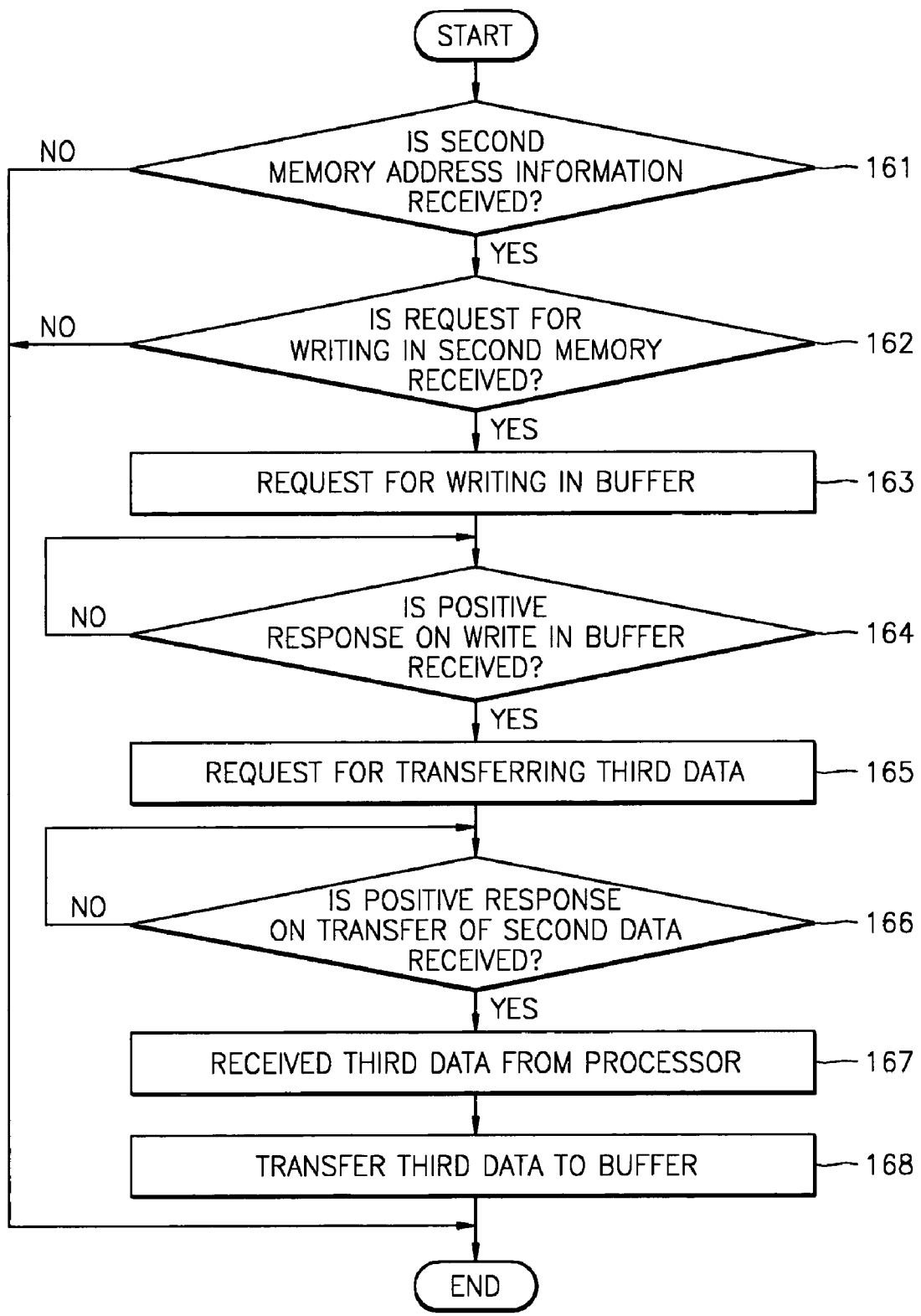
FIG. 16 is a detailed flowchart of steps 131, 135, and 136 of FIG. 13.

FIG. 16 is a detailed flowchart of steps 131, 135, and 136 of FIG. 13.

If address information indicating the address of the second memory is provided by the processor in step 161 and control information indicating a request for writing in the second memory is provided by the processor in step 162, control information indicating a request for writing in the buffer is generated and transferred to the buffer connected to the asynchronous bus in step 163. Generally, the processor outputs address information and control information at the same time and therefore steps 161 and 162 may be performed at the same time. Then, if control information indicating a positive response on the write in the buffer is provided by the buffer in step 164, control information indicating a request for transferring the third data is generated and transferred to the processor in step 165. Then, if control information indicating a positive response on the transfer of the third data is provided by the processor in step 166, the third data from the processor is received in step 167. Then, the received third data is transferred to the buffer in step 168.

Figure 17:
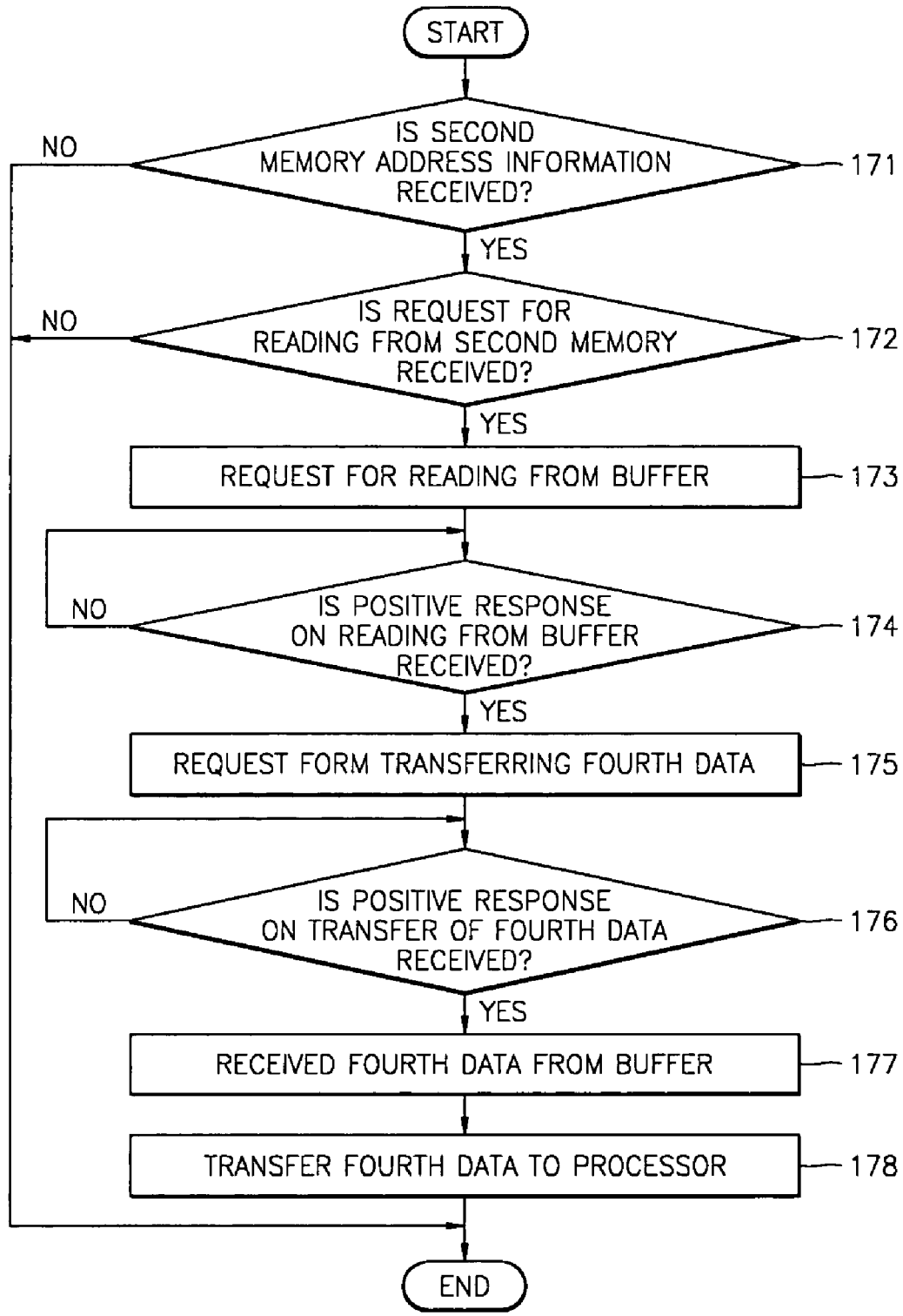
FIG. 17 is a detailed flowchart of steps 131, 135, and 137 of FIG. 13.

FIG. 17 is a detailed flowchart of steps 131, 135, and 137 of FIG. 13.

If control information indicating a request for reading from the second memory is provided by the processor in step 172, control information indicating a request for reading from the buffer is generated and transferred to the buffer connected to the asynchronous data bus in step 173. Generally, the processor outputs address information and control information at the same time and therefore the steps 171 and 172 may be performed at the same time. Then, if control information indicating a positive response on the read of the buffer is provided by the buffer in step 174, control information indicating a request for transferring the fourth data is generated and transferred to the buffer in step 175. Then, if control information indicating a positive response on the transfer of the fourth data is provided by the buffer in step 176, the fourth data from the buffer is received in step 177. Then, the received fourth data is transferred to the processor in step 178.

Figure 18:
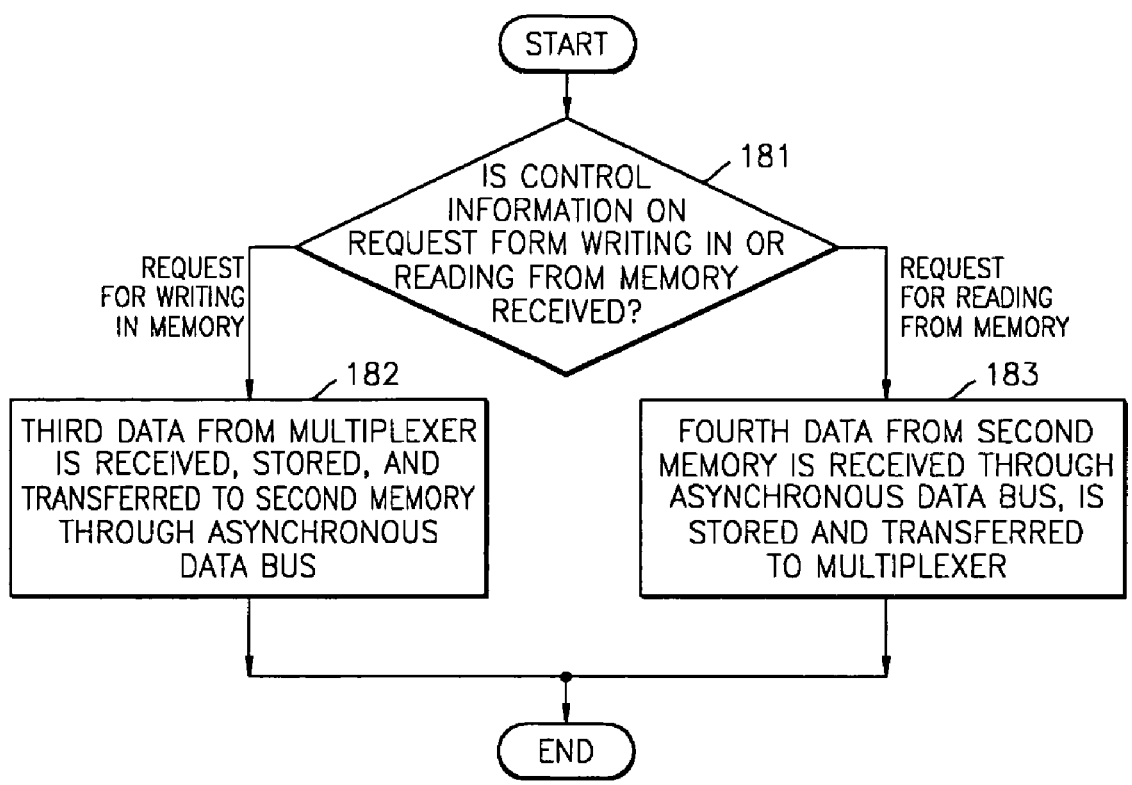
FIG. 18 is a flowchart of the steps performed by a buffering method according to an exemplary embodiment of the present invention.

FIG. 18 is a flowchart of the steps performed by a buffering method according to an exemplary embodiment of the present invention. If control information indicating a request for writing in the buffer connected to the asynchronous data bus not synchronized with the processor is provided by the multiplexer connected to the processor in step 181, the third data from the multiplexer is received and stored, and the stored third data is transferred to the second memory through the asynchronous data bus in step 182.

If control information indicating a request for reading from the buffer is provided by the multiplexer in step 181, the fourth data from the second memory is received through the asynchronous data bus and the stored fourth data is transferred to the multiplexer 183.

Figure 19:
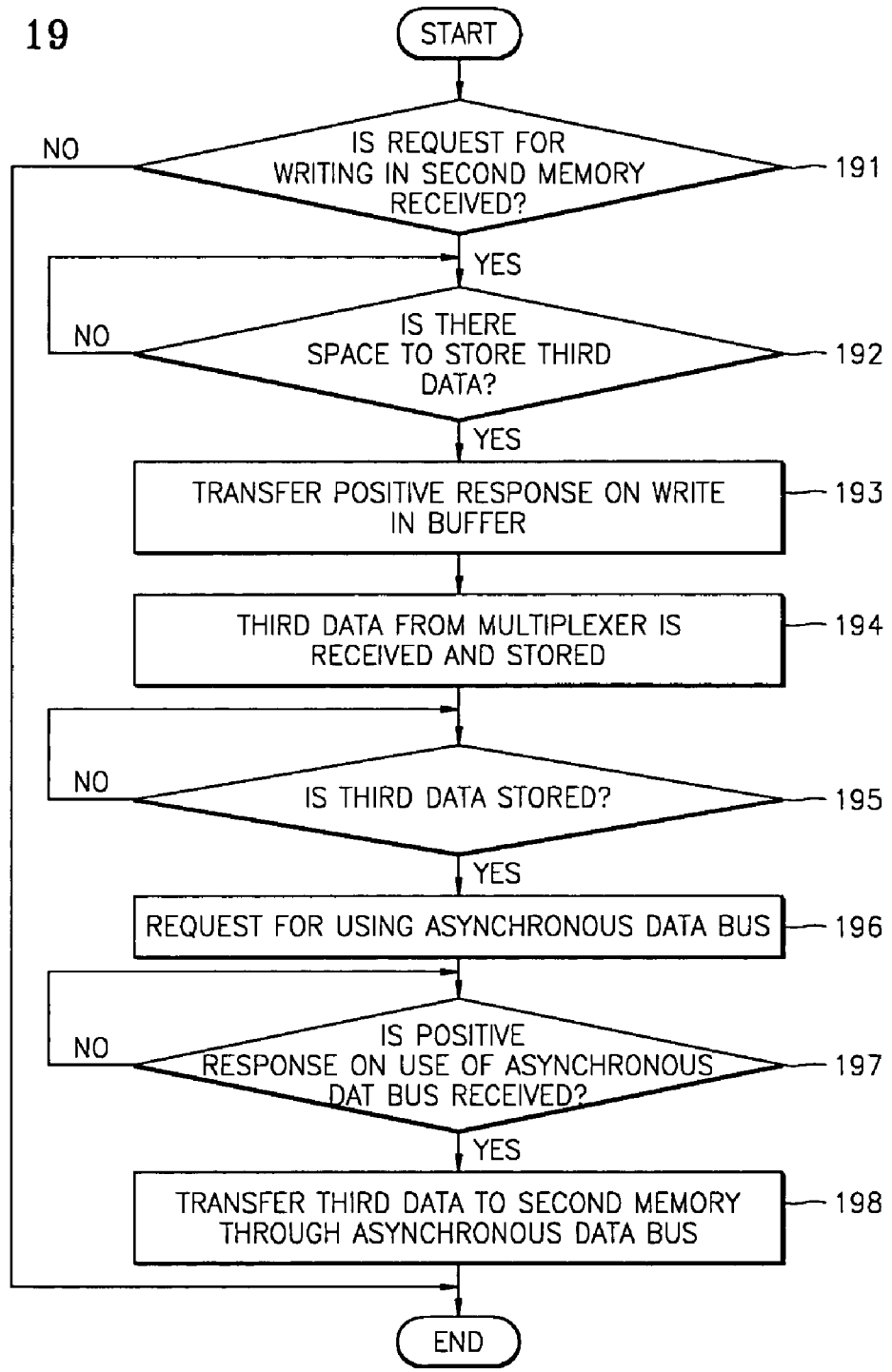
FIG. 19 is a detailed flowchart of steps 181 and 182 of FIG. 18.

FIG. 19 is a detailed flowchart of steps 181 and 182 of FIG. 18.

If control information indicating a request for writing in the buffer is provided by the multiplexer connected to the processor in step 191 and there is space to store the third data in step 192, control information indicating a positive response on the write in the buffer is generated and transferred to the multiplexer in step 193. Then, the third data from the multiplexer is received and stored in step 194. Then, if the third data is stored in step 195, control information indicating a request for using the asynchronous data bus is generated and transferred to the asynchronous data bus control apparatus which controls the asynchronous data bus in step 196. Then, if control information indicating a positive response on the use of the asynchronous data bus is provided by the asynchronous data bus control apparatus in step 197, the stored third data is transferred to the second memory through the asynchronous data bus in step 198.

Figure 20:
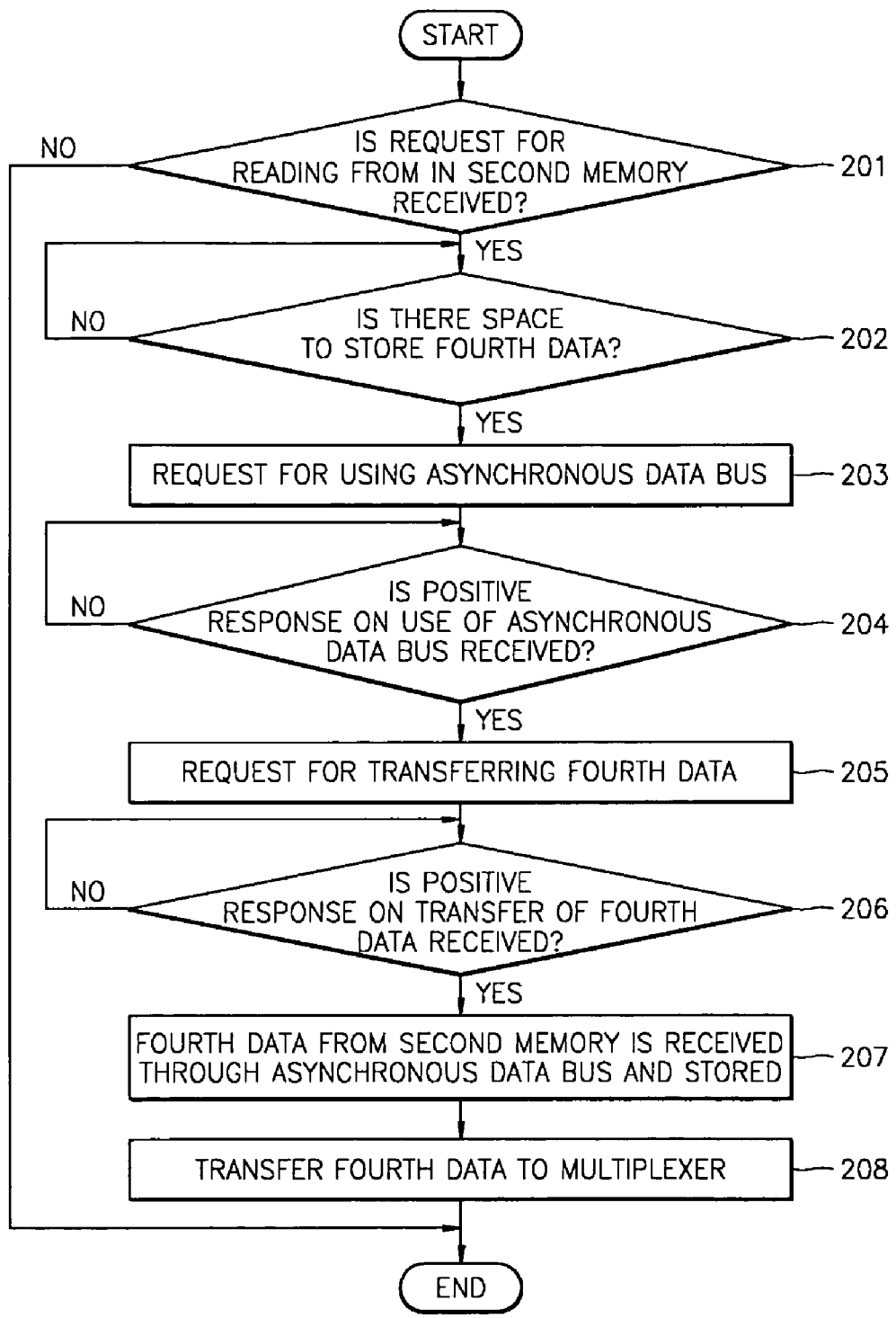
FIG. 20 is a detailed flowchart of steps 181 and 183 of FIG. 20.

FIG. 20 is a detailed flowchart of steps 181 and 183 of FIG. 20.

If control information indicating a request for reading from the buffer is provided by the multiplexer connected to the processor in step 201 and there is space to store the fourth data in step 202, control information indicating a request for using the asynchronous data bus is generated and transferred to the asynchronous data bus control apparatus which controls the asynchronous data bus in step 203.

Then, if control information indicating a positive response on the use of the asynchronous data bus is provided by the asynchronous data bus control apparatus in step 204, control information indicating a request for transferring the fourth data is generated and transferred to the asynchronous data bus control apparatus in step 205. Then, if a positive response on the transfer of the fourth data is provided by the asynchronous data bus control apparatus in step 206, the fourth data from the second memory is received through the asynchronous data bus in step 207. Then, if the fourth data is stored, control information indicating a positive response on the read of the buffer is generated and transferred to the multiplexer, and if control information indicating a request for transferring the fourth data is provided by the multiplexer, control information indicating a positive response on the transfer of the fourth data is generated and transferred to the multiplexer and the stored fourth data is transferred to the multiplexer in step 208.

Figure 21:
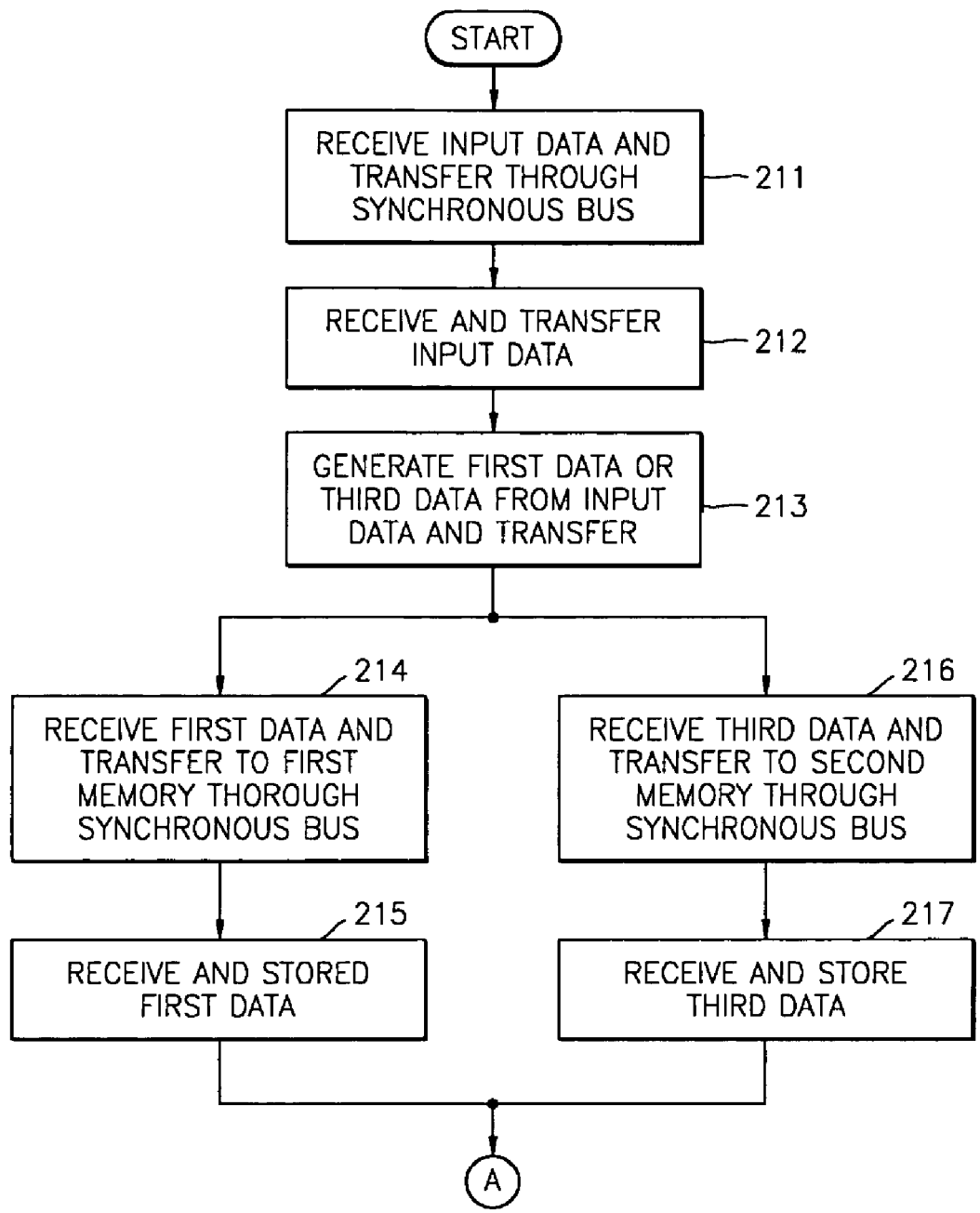
FIGS. 21 and 22 are a flowchart of the steps performed by a synchronous bus and asynchronous bus path method according to an exemplary embodiment of the present invention.
Figure 22:
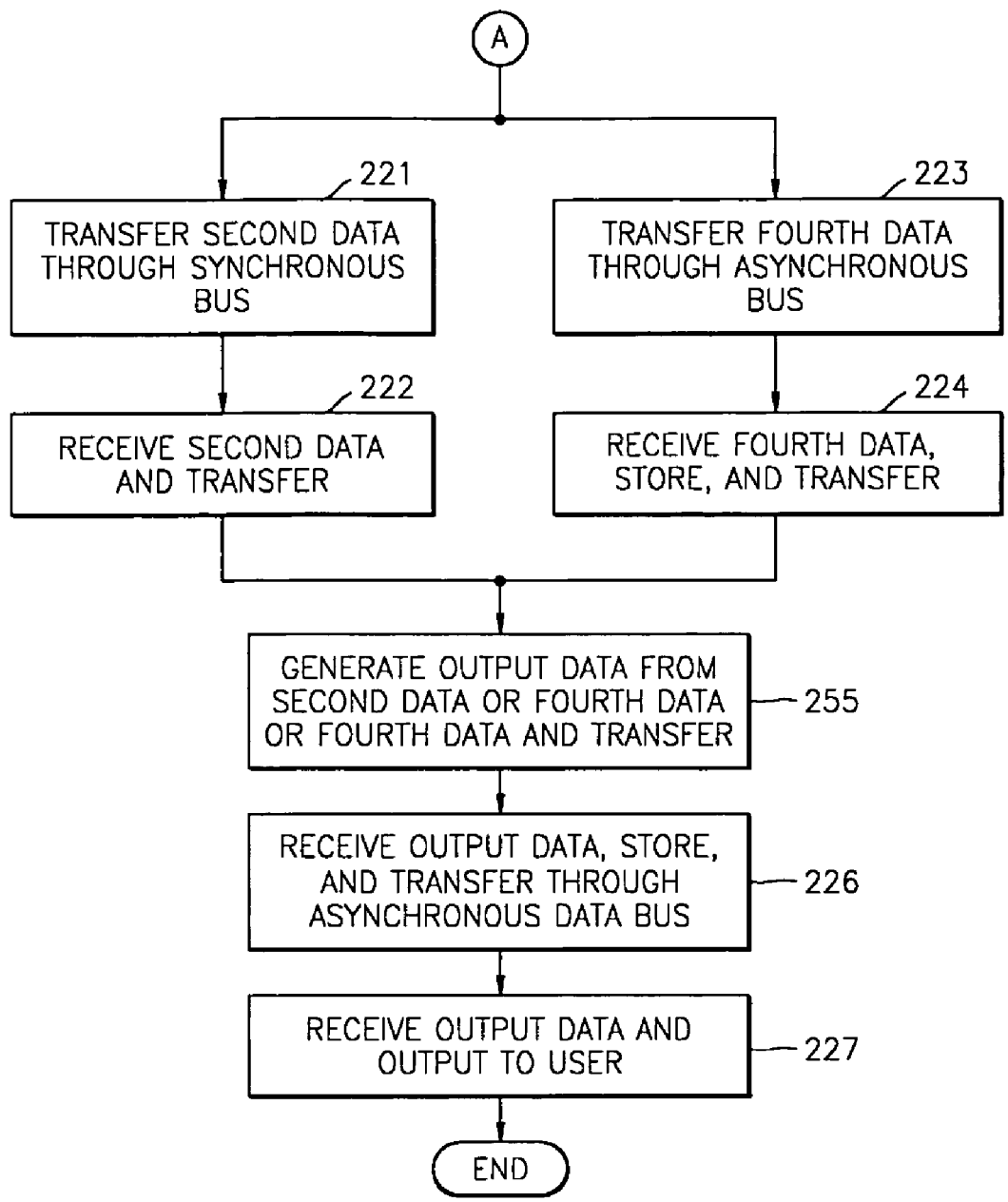

FIGS. 21 and 22 are a flowchart of the steps performed by a synchronous bus and asynchronous bus path method according to an exemplary embodiment of the present invention.

The input apparatus receives input data from the user and transfers the received input data to the processor bus connection apparatus through the synchronous bus synchronized with the processor in step 211. Then, the processor bus connection apparatus receives the input data through the synchronous bus and transfers the received input data to the processor in step 212. Then, the processor generates the first data or the third data from the received input data and transfers the generated data to the processor bus connection apparatus 213. Then, the processor bus connection apparatus receives the first data and transfers the received first data to the first memory through the synchronous data bus in step 214, or receives and stores the third data and transfers the stored third data to the second memory through the asynchronous bus not synchronized with the processor in step 216.

Then, the first memory receives the first data through the synchronous bus and stores the first data in step 215. Then, the second memory receives the third data through the asynchronous bus and stores the third data in step 217. Then, the first memory transfers the stored second data through the synchronous bus in step 221. Then, the second memory transfers the stored fourth data through the asynchronous bus in step 223. Then, the processor bus connection apparatus receives the second data through the synchronous bus and transfers the received second data to the processor in step 222, or receives the fourth data through the asynchronous bus, stores the fourth data, and transfers the stored fourth data to the processor in step 224. Then, the processor generates output data from the second data or the fourth data and transfers the output data in step 225. Then, the processor bus connection apparatus receives and stores the output data and transfers the stored output data to the output apparatus through the asynchronous bus in step 226. Then, the output apparatus receives the output data through the asynchronous bus and outputs the received output data to the user, or receives the third data from the second memory through the asynchronous bus and outputs the received third data to the user in step 227. Here, if the received output data or the received third data is display data, the received data is displayed to the user.

A step for the synchronous bus control apparatus giving permission on the use of the synchronous bus and a step for the asynchronous bus control apparatus giving permission on the use of the asynchronous bus may be added to the method. In this case, in the step 211, the received input data is transferred through the synchronous bus for which permission to use is given. In the step 212, the input data is received through the synchronous bus for which permission to use is given. In the step 214, the received first data is transferred to the first memory through the synchronous data bus for which permission to use is given. In the step 216, the stored third data is transferred to the second memory through the asynchronous bus for which permission to use is given. In the step 215, the first data is received through the synchronous bus for which permission to use is given, and stored. In the step 217, the third data is received through the asynchronous bus for which permission to use is given, and stored. In the step 221, the second data is transferred through the synchronous bus for which permission to use is given.

In the step 223, the fourth data is transferred through the asynchronous bus for which permission to use is given. In the step 222, the second data is received through the synchronous bus for which permission to use is given and the received second data is transferred. In the step 224, the fourth data is received through the asynchronous bus for which permission to use is given and the stored fourth data is transferred. In the step 226, the output data is received and stored and the stored output data is transferred through the asynchronous bus for which permission to use is given. In the step 227, the output data is received through the asynchronous bus for which permission to use is given and the received output data is output to the user, or the third data from the second memory is received through the asynchronous bus for which permission is given and the received third data is output.

A step for bridge DMA receiving the second data from the first memory through the synchronous data bus and transferring the received second data to the second memory through the asynchronous bus, or receiving the fourth data from the second memory through the asynchronous bus and transferring the received fourth data to the first memory through the synchronous data bus may be added to the method. In this case, in the step 215, the first data or the fourth data is received through the synchronous bus and stored. In the step 217, the third data or the second data is received through the asynchronous bus and stored. In the step 227, the output data is received through the asynchronous bus and the received data is output to the user, or the third data is received through the asynchronous bus and the received third data is output to the user, or the first data is received through the asynchronous bus and the received data is output to the user.

The present invention may be embodied in a code, which can be read by a computer, on a computer readable recording medium. The computer readable recording medium includes all kinds of recording apparatuses on which computer readable data are stored. The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet).

Exemplary embodiments have been explained above and are shown in the drawings However, the present invention is not limited to the exemplary embodiments described above, and it is apparent that variations and modifications by those skilled in the art can be effected within the spirit and scope of the present invention defined in the appended claims.

According to the present invention, ordinary data that are processed by the processor are transferred through the synchronous bus synchronized with the processor and display data are transferred through the asynchronous bus not synchronized with the processor. Accordingly, even though the amount of data needed in a display apparatus increases due to the growing size of display screens and improvement in picture quality, the increase will not affect the bandwidth of the working memory space of the processor such that the highest performance aimed by the processor can be achieved. Also, since the parts related to display such as a display apparatus and a display memory can be designed independently irrespective of the clock of the processor, only those parts can be designed to operate at a high speed. Accordingly, the burden for designing the entire system to operate at a high speed can be reduced and the increase in the power consumption when the system operates at a high speed can be controlled. In addition, the bandwidth of the display memory can be set irrespective of the performance of the processor. That is, choices on display memories can be expanded.

What is claimed is:

1. A buffering apparatus comprising:
   an asynchronous data bus write unit which, when control information indicating a request for writing in a buffer connected to an asynchronous data bus not synchronized with a processor is provided by a multiplexer connected to the processor, receives third data from the multiplexer, stores the third data, and transfers the stored third data to a second memory through the asynchronous data bus; and
   an asynchronous data bus read unit which, when control information indicating a request for reading from the buffer is provided by the multiplexer, receives fourth data from the second memory through the asynchronous data bus, stores the fourth data, and transfers the stored fourth data to the multiplexer,
   wherein the multiplexer receives first data from the processor and transfers the received first data to a first memory through a synchronous data bus synchronized with the processor, or receives second data from the first memory through the synchronous data bus and transfers the received second data to the processor.

2. A processor bus connection method comprising:
   (a) when address information indicating an address of a first memory connected to a synchronous data bus synchronized with a processor, from the processor is received, receiving first data from the processor and transferring the received first data to the first memory through the synchronous data bus, or receiving second data from the first memory through the synchronous data bus and transferring the received second data to the processor; and
   (b) when address information indicating an address of a second memory connected to an asynchronous data bus not synchronized with the processor, from the processor is received, receiving third data from the processor, transferring the third data, storing the transferred third data, and transferring the stored third data to the second memory through the asynchronous data bus, or receiving fourth data from the second memory through the asynchronous data bus, storing the fourth data, transferring the stored fourth data, receiving the transferred fourth data, and transferring the received fourth data to the processor.

3. The processor bus connection method of claim 2, wherein (a) comprises:
   (a1) when the address information indicating the address of the first memory is provided by the processor and control information indicating a request for writing in the first memory is provided by the processor, receiving the first data from the processor and transferring the received first data to the first memory through the synchronous data bus; and
   (a2) when the address information indicating the address of the first memory is provided by the processor and the control information indicating the request for reading from the first memory is provided by the processor, receiving the second data from the first memory through the synchronous data bus and transferring the received data to the processor.

4. A synchronous bus and asynchronous bus path method comprising:
   (a) receiving input data and transferring the received input data through a synchronous bus synchronized with a processor;
   (b) receiving the input data through the synchronous bus and transferring the received input data;
   (c) generating first data or third data from the transferred input data and transferring the generated first or third data;
   (d) receiving the first data, transferring the received first data to a first memory through the synchronous data bus, or receiving and storing the third data and transferring the stored third data to a second memory through an asynchronous bus not synchronized with the processor;

(e) receiving the first data through the synchronous bus and storing the first data; and (f) receiving the third data through the asynchronous bus and storing the third data.

5. The method of claim 4, further comprising:

(g) transferring second data through the synchronous bus;

(h) transferring fourth data through the asynchronous bus;

(i) receiving the second data through the synchronous bus and transferring the received second data, or receiving the fourth data through the asynchronous bus, storing the fourth data, and transferring the stored fourth data;

(j) generating output data from the second data or fourth data and transferring the output data;

(k) receiving and storing the output data and transferring the stored output data through the asynchronous bus; and (l) receiving the output data through the asynchronous bus and outputting the received output data, or receiving the third data from the second memory through the asynchronous bus and outputting the received third data.

6. The method of claim 5, wherein if the received output data or the received third data is display data, the received output data is displayed.

7. The method of claim 5, further comprising:

(m) giving permission on the use of the synchronous bus; and (n) giving permission on the use of the asynchronous bus.

8. The method of claim 7, wherein in (a), the received input data is transferred through the synchronous bus for which permission to use is given in (m); in (b), the input data is received through the synchronous bus for which permission to use is given in (m); in (d), the received first data is transferred to the first memory through the synchronous data bus for which permission to use is given in (m), or the stored third data is transferred to a second memory through the asynchronous bus for which permission to use is given in (n); in (d), the first data is received through the synchronous bus for which permission to use is given in (m) and stored; and in (f), the third data is received through the asynchronous bus for which permission to use is given in (n) and stored.

9. The method of claim 8, wherein in (g), the second data is transferred through the synchronous bus for which permission to use is given in (m); in (h), the fourth data is transferred through the asynchronous bus for which permission to use is given in (n); in (i), the second data is received through the synchronous bus for which permission to use is given in (m) and the received second data is transferred, or the fourth data is received through the asynchronous bus for which permission to use is given in (n), stored, and the stored fourth data is transferred; in (k) the output data is received and stored, and the stored output data is transferred through the asynchronous bus for which permission to use is given in (n); and in (l), the output data is received through the asynchronous bus for which permission to use is given in (n) and the received output data is output to a user, or the third data from the second memory is received through the asynchronous bus for which permission to use is given in (n) and the received third data is output.

10. A tangible computer readable recording medium including a computer program having instructions for controlling a synchronous bus and asynchronous bus, the instructions comprising:

(a) receiving input data and transferring the received input data through the synchronous bus synchronized with a processor;

(b) receiving the input data through the synchronous bus and transferring the received input data;

(c) generating first data or third data from the transferred input data and transferring the generated first or third data;

(d) receiving the first data, transferring the received first data to a first memory through the synchronous data bus, or receiving and storing third data and transferring the stored third data to a second memory through an asynchronous bus not synchronized with the processor;

(e) receiving the first data through the synchronous bus and storing the first data; and (f) receiving the third data through the asynchronous bus and storing the third data.

* * * * *